United States Patent
Brdiczka et al.

(10) Patent No.: US 12,061,916 B2
(45) Date of Patent: Aug. 13, 2024

(54) GENERATING PERSONALIZED IN-APPLICATION RECOMMENDATIONS UTILIZING IN-APPLICATION BEHAVIOR AND INTENT

(71) Applicant: Adobe Inc., San Jose, CA (US)

(72) Inventors: Oliver Brdiczka, San Jose, CA (US); Thomas Donahue, Carlsbad, CA (US); Neha Gautam, San Jose, CA (US); Kyoung Tak Kim, San Ramon, CA (US); Jakub Plichta, San Anselmo, CA (US); Keenan Villani-Holland, San Francisco, CA (US); Gabriel Palma Coelho, San Jose, CA (US); Chun Hao Wang, San Jose, CA (US); Allan Young, Santa Rosa, CA (US)

(73) Assignee: Adobe Inc., San Jose, CA (US)

( * ) Notice: Subject to any disclaimer, the term of this patent is extended or adjusted under 35 U.S.C. 154(b) by 88 days.

(21) Appl. No.: 17/657,477

(22) Filed: Mar. 31, 2022

(65) Prior Publication Data
US 2023/0315491 A1 Oct. 5, 2023

(51) Int. Cl.
*G06F 9/451* (2018.01)
(52) U.S. Cl.
CPC .................... *G06F 9/451* (2018.02)
(58) Field of Classification Search
None
See application file for complete search history.

(56) References Cited

U.S. PATENT DOCUMENTS

| | | | | |
|---|---|---|---|---|
| 9,836,765 B2* | 12/2017 | Hariri | ............... | G06Q 30/0631 |
| 2008/0250026 A1* | 10/2008 | Linden | ............... | G06F 16/904 |
| 2013/0103628 A1* | 4/2013 | Skelton | ............... | G06Q 30/02 |
| | | | | 706/46 |
| 2013/0179252 A1* | 7/2013 | Dong | ............... | G06F 16/954 |
| | | | | 706/45 |

(Continued)

OTHER PUBLICATIONS

James Le, Recommendation System Series Part 4: The 7 Variants of Matrix Factorization for Collaborative Filtering, 2020, https://towardsdatascience.com/recsys-series-part-4-the-7-variants-of-matrix-factorization-for-collaborative-filtering-368754e4fab5.

(Continued)

*Primary Examiner* — Charles E Anya
(74) *Attorney, Agent, or Firm* — Keller Preece PLLC

(57) ABSTRACT

The present disclosure relates to systems, methods, and non-transitory computer-readable media that recommends application features of software applications based on in-application behavior and provides the recommendations within a dynamically updating graphical user interface. For instance, in one or more embodiments, the disclosed systems utilize behavioral signals reflecting the behavior of a user with respect to one or more software applications to recommend application features of the software application(s). For instance, in some cases, the disclosed systems recommend an application feature related to recent activity user, an application feature from a curated recommendation list that has yet to be viewed, and/or an application feature determined via machine learning. In some embodiments, the disclosed systems dynamically update a graphical user interface of a client device in real time as the user utilizes the client device to access and navigate the software application(s) to display these recommendations.

20 Claims, 9 Drawing Sheets

(56) References Cited

U.S. PATENT DOCUMENTS

| | | | | |
|---|---|---|---|---|
| 2017/0061286 A1* | 3/2017 | Kumar | ............... | G06Q 30/0269 |
| 2017/0097743 A1* | 4/2017 | Hameed | ................ | G06F 3/0484 |
| 2021/0044674 A1* | 2/2021 | Govan | .................... | H04L 67/53 |
| 2021/0200824 A1* | 7/2021 | Kim | .................... | G06F 16/9535 |
| 2021/0406838 A1* | 12/2021 | Ramanath | .............. | G06N 20/20 |
| 2022/0351021 A1* | 11/2022 | Biswas | ................. | G06N 3/047 |

OTHER PUBLICATIONS

AWS; "Blazing Text Algorithm"; Date downloaded May 11, 2022; https://docs.aws.amazon.com/sagemaker/latest/dg/blazingtext.html.

Victor Sanh et al., DistilBERT, a distilled version of BERT: smaller, faster, cheaper, and lighter, arXiv:1910.01108, Mar. 1, 2020.

Zhang, Shuai et al.; "Next Item Recommendation with Self-Attention"; Aug. 25, 2018; https://arxiv.org/pdf/1808.06414.pdf.

Sun, Fei et al.; "BERT4Rec: Sequential Recommendation with Bidirectional Encoder Representations from Transformer"; Aug. 21, 2019; https://arxiv.org/pdf/1904.06690.pdf.

Github; NVIDIA-Merlin/publications; Transformers4Rec: Bridging the Gap between NLP and Sequential / Session-Based Recommendation; Date downloaded May 25, 2022; https://github.com/NVIDIA-Merlin/publications/tree/main/2021_acm_recsys_transformers4rec.

* cited by examiner

GENERATING PERSONALIZED IN-APPLICATION RECOMMENDATIONS UTILIZING IN-APPLICATION BEHAVIOR AND INTENT

BACKGROUND

Recent years have seen significant advancement in hardware and software platforms for enabling client devices to create and/or manipulate digital content. For example, many platforms offer packages in the form of software applications that provide a set of features for creating and/or manipulating digital content. Some of these platforms further implement systems for recommending, to a client device, particular features of a software application to provide access to, or information regarding, the tools that are available.

SUMMARY

One or more embodiments described herein provide benefits and/or solve one or more of problems in the art with systems, methods, and non-transitory computer-readable media that flexibly generate personalized application feature recommendations for display within a dynamically updating graphical user interface based on in-application behavior. For instance, in one or more embodiments, a system captures the user context of a user of a client device by monitoring in-application behavior with respect to one or more software applications (e.g., in-application behavior performed via the client device). The system further recommends one or more features of the software application(s) based on the user context. As the user context changes (e.g., based on changing in-application behavior), the system changes the recommended features in real time. In some cases, the system provides the recommendations within a dynamically updated landing surface associated with the software application(s), facilitating display of the current recommendations as the client device accesses the software application(s). In this manner, the system flexibly recommends application features that are currently relevant to the user of the client device, reducing the number of user interactions required to access those features.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
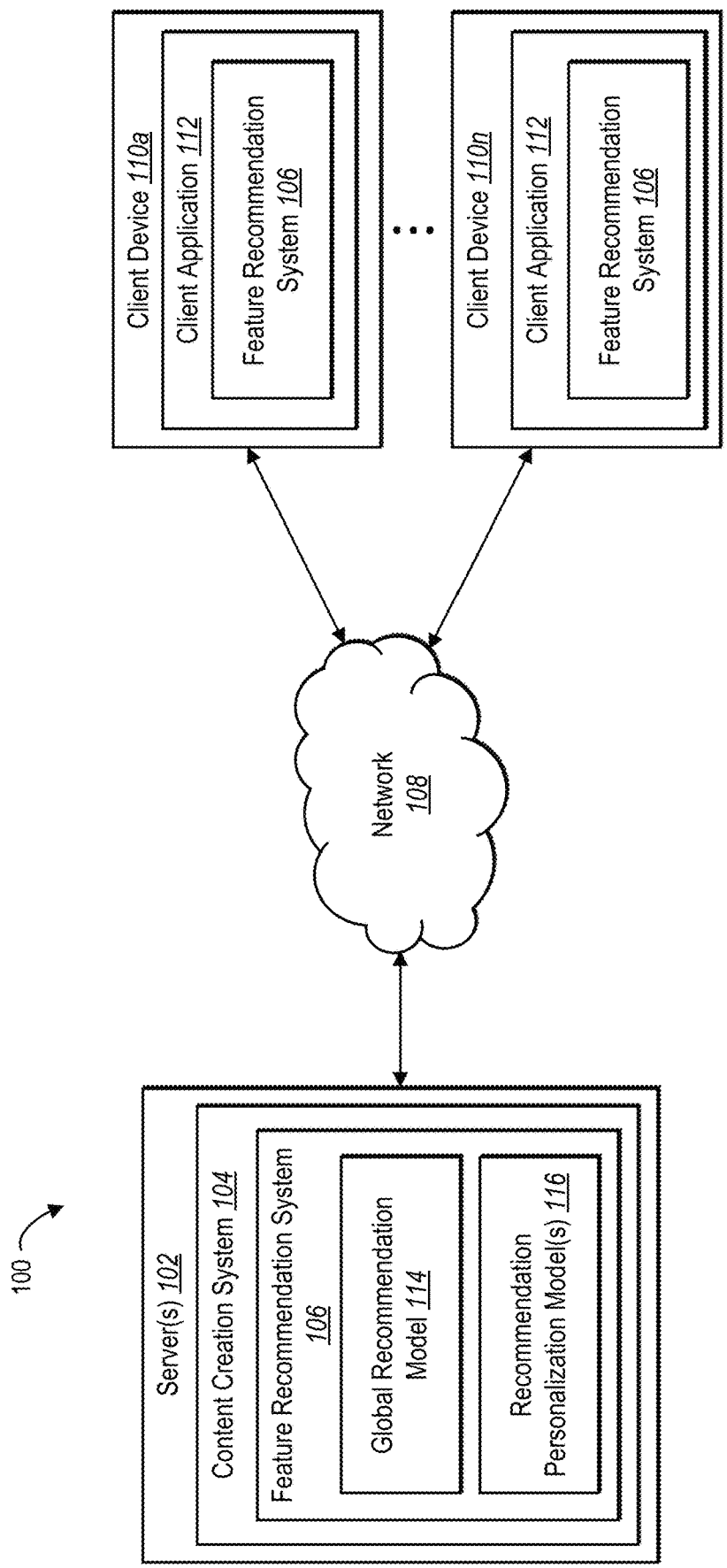
FIG. 1 illustrates an example environment in which feature recommendation system operates in accordance with one or more embodiments.

One or more embodiments described herein include a feature recommendation system that utilizes a dynamic graphical user interface and user interactions with one or more software applications to provide recommendations for application features that are relevant to a user. To illustrate, in some embodiments, the feature recommendation system collects and stores signals related to user behavior within one or more software applications (e.g., signal aggregations determined via a server and/or a client device of the user). In some embodiments, the feature recommendation system utilizes the signals (e.g., the aggregations) to determine features of the software application(s) to recommend to the user. For example, in some instances, the feature recommendation system generates a recommendation based on a user context represented by the signals using one or more machine learning models. In some implementations, the feature recommendation system dynamically updates a graphical user interface of the client device of the user in real time to display the recommendation in response to a request trigger. Further in some cases, the feature recommendation system updates the models used to determine recommendations based on user feedback and/or user interactions with the provided recommendations.

To provide an illustration, in one or more embodiments, the feature recommendation system provides a visual recommendation component for display within a graphical user interface of a client device, the visual recommendation component comprising at least one recommendation for an application feature associated with a suite of software applications accessible to the client device. Additionally, the feature recommendation system determines a user context for a user of the client device using one or more behavioral signals reflecting a behavior with respect to one or more software applications from the suite of software applications. Using the user context, the feature recommendation system generates one or more additional recommendations for one or more additional application features associated with the suite of software applications in real time and in response to detecting a recommendation request trigger. The feature recommendation system further causes the client device to update the visual recommendation component of the graphical user interface to display the one or more additional recommendations.

As just mentioned, in one or more embodiments, the feature recommendation system generates recommendations for application features using in-application behavior. Indeed, in some embodiments, the feature recommendation system collects and stores behavioral signals related to the behavior of a user within one or more software applications from a suite of software applications (e.g., behavior performed via a client device of the user). In some instances, the behavioral signals correspond to more than content consumptions signals. Indeed, in some cases, the behavioral signals provide a more holistic view of the in-application behavior. For example, in some instances, the behavioral signals correspond to document properties or the skill level of the user.

In some implementations, the feature recommendation system utilizes aggregations of behavioral signals to generate the recommendations. In particular, in one or more embodiments, the feature recommendation system aggregates the collected behavioral signals (e.g., via a server device and/or the client device of the user) to determine one or more behavior trends with respect to the software application(s) (e.g., lifetime tool usage or weekly intent categories). In some cases, the feature recommendation system stores the aggregations on a per-user basis.

In one or more embodiments, the feature recommendation system implements various approaches for generating recommendations using the behavioral signals (e.g., the aggregations). For instance, in some embodiments, the feature recommendation system generates a recommendation based on previous activity of a client device of the user with respect to the software application(s) (e.g., a software tool previously used via the software application(s)). In some cases, the feature recommendation system filters a curated list of recommendations based on application features previously accessed via a client device of the user and selects one or more recommendations from the curated list.

In one or more embodiments, the feature recommendation system determines a user context of the user from the behavioral signals (e.g., the aggregations) and determines a recommendation based on the user context using one or more models. For example, in some instances, the feature recommendation system utilizes a global recommendation model (e.g., a machine learning model) that corresponds to a plurality of users of the software application(s) (e.g., reflects the in-application behaviors of those users). In some embodiments, the feature recommendation system further utilizes a recommendation personalization model (e.g., a boosting model and/or a filtering model) that corresponds to the particular preferences of the user. In some cases, the feature recommendation system modifies the parameters of the global recommendation model and/or the recommendation personalization model based on user feedback regarding provided recommendations.

As further mentioned, in one or more embodiments, the feature recommendation system provides the generated recommendations for display within a visual recommendation component of a graphical user interface displayed on a client device of the user. In particular, in some cases, the feature recommendation system causes the client device to update the visual recommendation component to display the generated recommendations. For instance, in some cases, the visual recommendation system displays previously generated recommendations, and the feature recommendation system causes the client device to update the visual recommendation component to replace the previously generated recommendations with newly generated recommendations.

In some embodiments, the feature recommendation system determines the recommendations and causes the client device to update the visual recommendation component in real time in response to receiving a recommendation request trigger. Indeed, in some cases, the feature recommendation system dynamically updates the visual recommendation component to present the newly generated recommendations that incorporate recent in-application behavior. Thus, in some cases, the feature recommendation system changes the recommendations that are displayed based on changes to the in-application behavior.

The feature recommendation system provides several advantages over conventional systems. For example, conventional feature recommendation systems suffer from several technological shortcomings that result in inflexible and inefficient operation. For instance, while conventional systems recommend certain features, these recommendations are typically static. Indeed, in many cases, conventional systems provide recommendations for a pre-determined set of application features. Thus, these recommendations often remain unchanged over time and are provided regardless of their relevance to a user of the client device. Some conventional systems attempt to improve the relevance of recommendations using a next-action-prediction that is based on previously consumed content. These systems, however, typically fail to provide truly relevant recommendations as they make the predictions using a global model that is tuned to an entire population of users having various preferences and behaviors.

Additionally, conventional recommendation systems often fail to operate efficiently. For example, because conventional systems tend to provide static recommendations that are irrelevant to a user of the client device, such systems typically require a significant amount of user interactions with the client device to access those application features that are relevant. Indeed, such systems may require user interactions to navigate various menus, sub-menus, and/or windows to locate and interact with a desired application feature.

For example, the feature recommendation system operates with improved flexibility when compared to conventional systems. In particular, by dynamically updating the recommendations that are presented, the feature recommendation system flexibly improves upon the static recommendations provided under conventional systems. Further, by generating recommendations using the in-application behavior of a user, the feature recommendation system flexibly recommends application features that are relevant to the user (e.g., relevant to a task of the user or more likely to be used by the user). In some cases, the feature recommendation system further improves the relevancy of the recommendations by using a recommendation personalization model that is tuned to the preferences of the user rather than the totality of preferences of many users.

Further, the feature recommendation system operates more efficiently than conventional systems. For example, by providing recommendations that are relevant to a user, the feature recommendation system reduces the user interactions typically required by conventional systems to access relevant application features. Indeed, in many instances, the feature recommendation system eliminates interactive steps needed to navigate through various menus, sub-menus, and/or windows to access a desired feature.

As illustrated by the foregoing discussion, the present disclosure utilizes a variety of terms to describe features and benefits of the feature recommendation system. Additional detail is now provided regarding the meaning of these terms.

For example, as used herein, the term "application feature" refers to a feature that is provided by and/or accessible via a software application. In particular, in some embodiments, an application feature refers to a tool, a setting, a characteristic, or an attribute of a software application. To illustrate, in some embodiments, an application feature refers to a tool, a setting, a characteristic, or an attribute of a software application that can be used to create and or manipulate (e.g., modify) digital content.

Additionally, as used herein, the term "behavioral signal" refers to digital data related to behavior with respect to a software application. In particular, in some embodiments, a behavioral signal refers to in-application behavior of a user (e.g., performed via a client device). Indeed, in some cases, a behavioral signal refers to digital data that reflects user interactions with a software application. For instance, in some cases, behavioral signals reflect actions performed within a software application, documents or other content accessed via a software application, content consumed via a software application, and/or settings established within a software application. To illustrate, in some instances, a behavioral signal includes, but is not limited to, digital data that reflects a content consumption (e.g., a content click, a browsing history, a content view, etc.), a tool usage, a document property (e.g., a tag or classification associated with a digital document, an object portrayed in a digital document, etc.), a user preference, a user intent, a creative category, or a skill level. In some cases, the feature recommendation system determines a behavioral signal (e.g., user intent) from one or more other behavioral signals.

Further, as used herein, the term "aggregation" refers to digital data corresponding to a collection of behavioral signals. In particular, in some embodiments, an aggregation refers to digital data reflecting a set of behavioral signals associated with the same user (e.g., associated with a client device or set of client devices of the same user). In some cases, an aggregation includes a set of raw, unprocessed behavioral signals. In some implementations, however, an aggregation includes digital data that results from processing a set of behavioral signals. For example, in some instances, an aggregation includes a de-duplicated history of events generated from a set of behavioral signals. Further, in some embodiments, an aggregation includes one or more statistics derived from a set of behavioral signals, such as statistics that indicate one or more behavior trends (e.g., daily tools used, lifetime tools used, image types used, daily/weekly intent categories, etc.). In some cases, an aggregation corresponds to a set of behavioral signals across a particular time window. In some implementations, however, an aggregation corresponds to all behavioral signals associated with a particular user.

As used herein, the term "user context" refers to a state of a user of one or more software applications or a state of a client device used to access and/or interact with the one or more software applications. In particular, in some embodiments, a user context refers to attributes or characteristics of a user that correspond to (e.g., are derivative of) a behavior of the user with respect to one or more software applications. To illustrate, in some cases, a user context includes one or more behavior trends of a user with respect to one or more software applications (e.g., as reflected by one or more aggregations of behavioral signals) or other attributes or characteristics that can be derived from or are otherwise related to the behavior trends.

Additionally, as used herein, the term "global recommendation model" refers to a computer-implemented recommendation model that corresponds to a plurality of users. In particular, in some embodiments, a global recommendation model refers to a computer-implemented model that generates recommendations based on the interests and/or behaviors of a population of users. To illustrate, in some cases, a global recommendation model recommends application features associated with one or more software applications based on the interests and/or behaviors of a population of users that utilize the software application(s). In some cases, a global recommendation model includes parameters that reflect the interests and/or behaviors of the corresponding population of users. For instance, in some implementations, a global recommendation model includes a machine learning model that learned parameters from the interests and/or behaviors of the corresponding population of users.

As used herein, a "machine learning model" refers to a computer representation that can be tuned (e.g., trained) based on inputs to approximate unknown functions. In particular, in some embodiments, a machine learning model refers to a model that utilizes algorithms to learn from, and make predictions on, known data by analyzing the known data to learn to generate outputs that reflect patterns and attributes of the known data. For instance, in some instances, a machine learning model includes, but is not limited to a neural network (e.g., a convolutional neural network, recurrent neural network or other deep learning network), a decision tree (e.g., a gradient boosted decision tree), association rule learning, inductive logic programming, support vector learning, Bayesian network, regression-based model (e.g., censored regression), principal component analysis, or a combination thereof.

Additionally, as used herein, the term "recommendation personalization model" includes a computer-implemented recommendation model that corresponds to one user. In particular, in some embodiments, a recommendation personalization model refers to a computer-implemented model that generates recommendations based on the interests and/or behaviors of a single user. To illustrate, in some cases, a recommendation personalization model recommends application features associated with one or more software applications based on the interests and/or behaviors of a single user with respect to the software application(s). In some cases, a recommendation personalization model includes parameters that reflect the interests and/or behaviors of the corresponding population of users. Further, in some instances, as will be discussed below, a recommendation personalization model filters a set of recommendations generated from another model (e.g., a global recommendation model) to determine which of those recommendations to provide to a user in accordance with the personal preferences of the user (e.g., to determine which of the recommendations are best suited for the user based on the personal preferences).

In one or more embodiments, a recommendation personalization model includes a personalized boosting model. As used herein, the term "personalized boosting model" refers to a computer-implemented model that corresponds to one or more likes of a user. In particular, in some embodiments, a personalized boosting model refers to a computer-implemented model that prioritizes and/or deprioritizes recommendations for provision to a user based on the one or more likes of the user. In some cases, a personalized boosting model includes a machine learning model (e.g., a classification model) that learned features or categories that are to be prioritized for the corresponding user. In some instances, a personalized boosting model includes a list that prioritizes and/or deprioritizes application features based on the one or more likes of the user.

In some embodiments, a recommendation personalization model includes a personalized filtering model. As used herein, the term "personalized filtering model" refers to a computer-implemented model that corresponds to one or more dislikes of a user. In particular, in some embodiments, a personalized filtering model refers to a computer-implemented model that deprioritizes and/or prioritizes recommendations for provision to a user based on the one or more dislikes of the user. In some cases, a personalized filtering model includes a machine learning model (e.g., a classification model) that learned features or categories that are to be deprioritized for the corresponding user. In some instances, a personalized filtering model includes a list that deprioritizes and/or prioritizes application features based on the one or more dislikes of the user or a list that excludes one or more application features completely from being recommended (e.g., a deny list).

As used herein, the term "visual recommendation component" refers to a visual component of a graphical user interface for displaying recommendations. In particular, in some embodiments, a visual recommendation component refers to an element or portion of a graphical user interface displayed on a client device that shows one or more recommendations for application features. To illustrate, in some instances, a visual recommendation component is part of a landing or surface page associated with a suite of software applications and shows recommendations for application features associated with one or more software applications from the suite of software applications.

Additionally, as used herein, the term "user feedback" refers to feedback corresponding to a recommendation provided to a client device. In particular, in some embodiments, user feedback refers to feedback that indicates whether a user of the client device favored or disfavored a recommendation. In some cases, feedback can correspond to an interaction with a recommendation (e.g., a selection of the recommendation). In some instances, user feedback includes a direct communication regarding a recommendation, such as a request that a particular application feature or application feature of a particular type be disqualified from future recommendations or be recommended more frequently in the future.

Further, as used herein, the term "curated recommendation list" includes a pre-determined set of application features or application feature categories to be recommended. In particular, as used herein, a curated recommendation list includes a pre-determined set of application features or application feature categories from which one or more recommendations are to be generated. In some cases, a curated recommendation list corresponds to a plurality of users. For instance, in some implementations, the feature recommendation system generates one or more recommendations for a plurality of users using a curated recommendation list.

As used herein, the term "recommendation request trigger" refers to a signal that triggers the generation and provision of one or more recommendations. In particular, in some embodiments, a recommendation request trigger includes a signal that triggers the real-time generation and provision of one or more recommendations. In one or more embodiments, a recommendation request trigger corresponds to in-application behavior. For example, in some cases, a recommendation request trigger includes, but is not limited to, a closure of a software application, a visit of a home screen or landing page associated with a software application or suite of software applications, use of a specific tool, or detection of a threshold number of behavioral signals.

Additional detail regarding the feature recommendation system will now be provided with reference to the figures. For example, FIG. 1 illustrates a schematic diagram of an exemplary system 100 in which feature recommendation system 106 operates. As illustrated in FIG. 1, the system 100 includes a server(s) 102, a network 108, and client devices 110a-110n.

Although the system 100 of FIG. 1 is depicted as having a particular number of components, the system 100 is capable of having any number of additional or alternative components (e.g., any number of servers, client devices, or other components in communication with the feature recommendation system 106 via the network 108). Similarly, although FIG. 1 illustrates a particular arrangement of the server(s) 102, the network 108, and the client devices 110a-110n, various additional arrangements are possible.

The server(s) 102, the network 108, and the client devices 110a-110n are communicatively coupled with each other either directly or indirectly (e.g., through the network 108 discussed in greater detail below in relation to FIG. 9). Moreover, the server(s) 102 and the client devices 110a-110n include one or more of a variety of computing devices (including one or more computing devices as discussed in greater detail with relation to FIG. 9).

As mentioned above, the system 100 includes the server(s) 102. In one or more embodiments, the server(s) 102 generates, stores, receives, and/or transmits data including models, digital content, and recommendations for application features. In one or more embodiments, the server(s) 102 comprises a data server. In some implementations, the server(s) 102 comprises a communication server or a web-hosting server.

In one or more embodiments, the content creation system 104 provides functionality by which a user (e.g., a user of one of the client devices 110a-110n) generates, edits, manages, and/or stores digital content. For example, in some instances, a user utilizes a client device to access a software application hosted on the server(s) 102 via the network 108. The content creation system 104 then provides many options by which the user may utilize the software application to generate digital content, edit the digital content, store the digital content, and subsequently search for, access, and view the digital content.

In one or more embodiments, the client devices 110a-110n include computing devices that can access, edit, segment, modify, store, and/or provide, for display, digital content. For example, the client devices 110a-110n include smartphones, tablets, desktop computers, laptop computers, head-mounted-display devices, or other electronic devices. The client devices 110a-110n include one or more applications (e.g., the client application 112) that can access, edit, segment, modify, store, and/or provide, for display, digital content. For example, in one or more embodiments, the client application 112 includes a software application installed on the client devices 110a-110n. Additionally, or alternatively, the client application 112 includes a software application hosted on the server(s) 102 (and supported by the content creation system 104), which may be accessed by the client devices 110a-110n through another application, such as a web browser.

To provide an example implementation, in some embodiments, the feature recommendation system 106 on the server(s) 102 supports the feature recommendation system 106 on the client device 110n. For instance, in some cases, the feature recommendation system 106 on the server(s) 102 learns parameters for the global recommendation model 114 and the recommendation personalization model(s) 116. The feature recommendation system 106 then, via the server(s) 102, provides the global recommendation model 114 and one of the recommendation personalization model(s) 116 to the client device 110n. In other words, the client device 110n obtains (e.g., downloads) the global recommendation model 114 and the one of the recommendation personalization model(s) 116 with the learned parameters from the server(s) 102. Once downloaded, the feature recommendation system 106 on the client device 110n utilizes the global recommendation model 114 and the one of the recommendation personalization model(s) 116 to generate recommendations for application features independent from the server(s) 102.

In alternative implementations, the feature recommendation system 106 includes a web hosting application that allows the client device 110n to interact with content and services hosted on the server(s) 102. To illustrate, in one or more implementations, the client device 110n accesses a software application supported by the server(s) 102. In response, the feature recommendation system 106 on the server(s) 102 generates and provides one or more recommendations for application features. The server(s) 102 then provides the recommendations to the client device 110n for display.

To illustrate, in some cases, the feature recommendation system 106 on the client device 110n collects and aggregates one or more behavioral signals reflecting a behavior with respect to a software application supported by the server(s) 102. The client device 110n transmits the aggregation (e.g., a de-duplicated timestamp history of events) to the server(s) 102. In response, the feature recommendation system 106 on the server(s) 102 further aggregates the behavioral signals, determines a user context from the aggregation, and generates and provides one or more recommendations for application features.

Indeed, the feature recommendation system 106 is able to be implemented in whole, or in part, by the individual elements of the system 100. Indeed, although FIG. 1 illustrates the feature recommendation system 106 implemented with regard to the server(s) 102, different components of the feature recommendation system 106 are able to be implemented by a variety of devices within the system 100. For example, one or more (or all) components of the feature recommendation system 106 are implemented by a different computing device (e.g., one of the client devices 110a-110n) or a separate server from the server(s) 102 hosting the content creation system 104. Indeed, as shown in FIG. 1, the client devices 110a-110n include the feature recommendation system 106. Example components of the feature recommendation system 106 will be described below with regard to FIG. 7.

Figure 2:
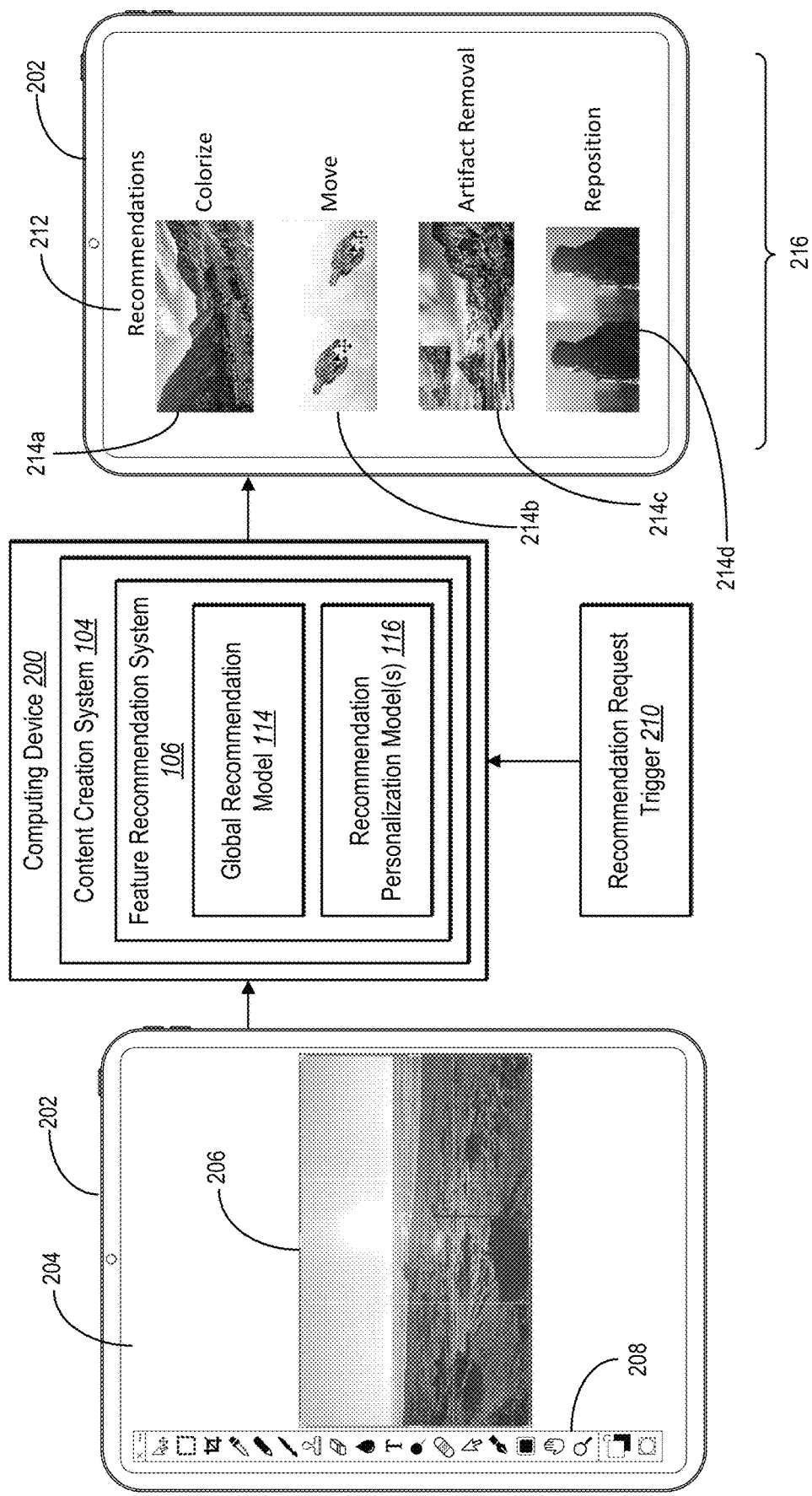
FIG. 2 illustrates an overview diagram of the feature recommendation system generating recommendations for application features in accordance with one or more embodiments.

As mentioned, in one or more embodiments, the feature recommendation system 106 generates and provides recommendations for application features. In particular, in some embodiments, the feature recommendation system 106 generates recommendations based on in-application behavior with respect to one or more software applications. FIG. 2 illustrates an overview diagram of the feature recommendation system 106 generating recommendations for application features in accordance with one or more embodiments.

For example, as shown in FIG. 2, the feature recommendation system 106 provides a graphical user interface 204 for display on a client device 202. For example, in some cases, the graphical user interface 204 is associated with a particular software application, and the feature recommendation system 106 provides the graphical user interface 204 in response to accessing or detecting an access of the software application via the client device 202.

As further shown in FIG. 2, the feature recommendation system 106 provides a digital document 206 (e.g., a digital image) for display within the graphical user interface 204. In one or more embodiments, the digital document 206 includes a digital document that is stored locally on the client device 202 or a digital document that is stored remotely, such as on a separate computing device. Additionally, as shown, the feature recommendation system 106 provides a tool menu 208 for display within the graphical user interface 204. In one or more embodiments, the tool menu 208 provides tools or other selectable options for modifying the digital document 206.

Thus, in one or more embodiments, the feature recommendation system 106 monitors behavior with respect to the software application by monitoring user interactions of the client device 202 (e.g., of a user of the client device 202) with the graphical user interface 204. For instance, in some cases, the feature recommendation system 106 monitors a user selection of one or more tools from the tool menu 208. Further, in some embodiments, the feature recommendation system 106 monitors a use of the selected tool(s) in editing the digital document 206. In some cases, the feature recommendation system 106 further determines properties of the digital document 206, such as an object portrayed within the digital document 206 or other characteristics of the digital document 206 (e.g., that the digital document 206 corresponds to a grayscale digital image). As discussed above, the feature recommendation system 106 can monitor various other forms of in-application behavior as well. In some cases, the feature recommendation system 106 monitors the behavior by generating, detecting, and/or receiving behavioral signals that reflect the behavior.

As shown in FIG. 2, the feature recommendation system 106 analyzes the behavior with respect to the software application. For instance, the feature recommendation system 106 analyzes the behavioral signals that reflect the behavior. For example, as shown in FIG. 2, in some implementations, the feature recommendation system 106 operates on a computing device 200 (e.g., the server(s) 102 or one of the client devices 110a-110n discussed above with reference to FIG. 1 or some other mobile computing device, such as smart phone or tablet). Accordingly, in some embodiments, the feature recommendation system 106 receives the behavioral signals from the client device 202 at the computing device 200 and analyzes the behavioral signals in response. As will be further discussed below, in some cases, the feature recommendation system 106 aggregates the behavioral signals and analyzes the resulting aggregation. In one or more embodiments, the feature recommendation system 106 utilizes the global recommendation model 114 and one of the recommendation personalization models from the recommendation personalization model(s) 116 to analyze the behavioral signals (e.g., the aggregation).

Additionally, as shown in FIG. 2, the feature recommendation system 106 receives a recommendation request trigger 210. In one or more embodiments, in response to receiving the recommendation request trigger 210, the feature recommendation system 106 generates one or more recommendations for application features associated with the software application based on the monitored behavior. For instance, in some cases, in response to receiving the recommendation request trigger 210, the feature recommendation system 106 analyzes behavioral signals reflective of the behavior (e.g., an aggregation of the behavioral signals) to generate the one or more recommendations.

As further shown in FIG. 2, the feature recommendation system 106 provides a graphical user interface 212 for display on the client device 202. Further, the feature recommendation system 106 provides the recommendations 214a-214d for display within the graphical user interface 212. In particular, the feature recommendation system 106 provides the recommendations 214a-214d for display within a visual recommendation component 216 of the graphical user interface 212. Indeed, in one or more embodiments, the feature recommendation system 106 provides the visual recommendation component 216 along with other visual components for display within the 212, though FIG. 2 only shows the visual recommendation component 216. For example, in some cases, the feature recommendation system 106 provides the visual recommendation component 216 with the recommendations 214a-214d for display as part of a landing page associated with one or more software applications, such as the software application(s) for which the in-application behavior is monitored.

To illustrate, in one or more embodiments, the feature recommendation system 106 receives the recommendation request trigger 210 by a closure of the software application. Thus, the feature recommendation system 106 provides the graphical user interface 212 and the recommendations 214a-214d upon re-accessing or detecting access of the software application. For instance, in some cases, the graphical user interface 212 corresponds to a landing page of the software applications, and the feature recommendation system 106 provides the recommendations 214a-214d within the landing page.

In some implementations, the feature recommendation system 106 generates and provides the recommendations 214a-214d in real time in response to receiving the recommendation request trigger 210. For example, in some cases, the feature recommendation system 106 receives the recommendation request trigger 210 by determining that the client device 202 is navigating back to the landing page of the software application (rather than exiting the software application altogether). Accordingly, the feature recommendation system 106 generates and provides the recommendations 214a-214d by the time the client device 202 displays the landing page (e.g., the graphical user interface 212).

Though FIG. 2 discusses generating and providing recommendations based on in-application behavior with respect to one software application, it should be noted that the feature recommendation system 106 generates and provides recommendations based on in-application behavior with respect to a suite of software applications in some cases. Indeed, in some embodiments, the software application discussed above is part of a suite of software applications. Accordingly, in such embodiments, the feature recommendation system 106 utilizes in-application behavior with respect to the various software applications from the suite to generate and provide recommendations for application features associated with the suite of software applications.

Figure 3:
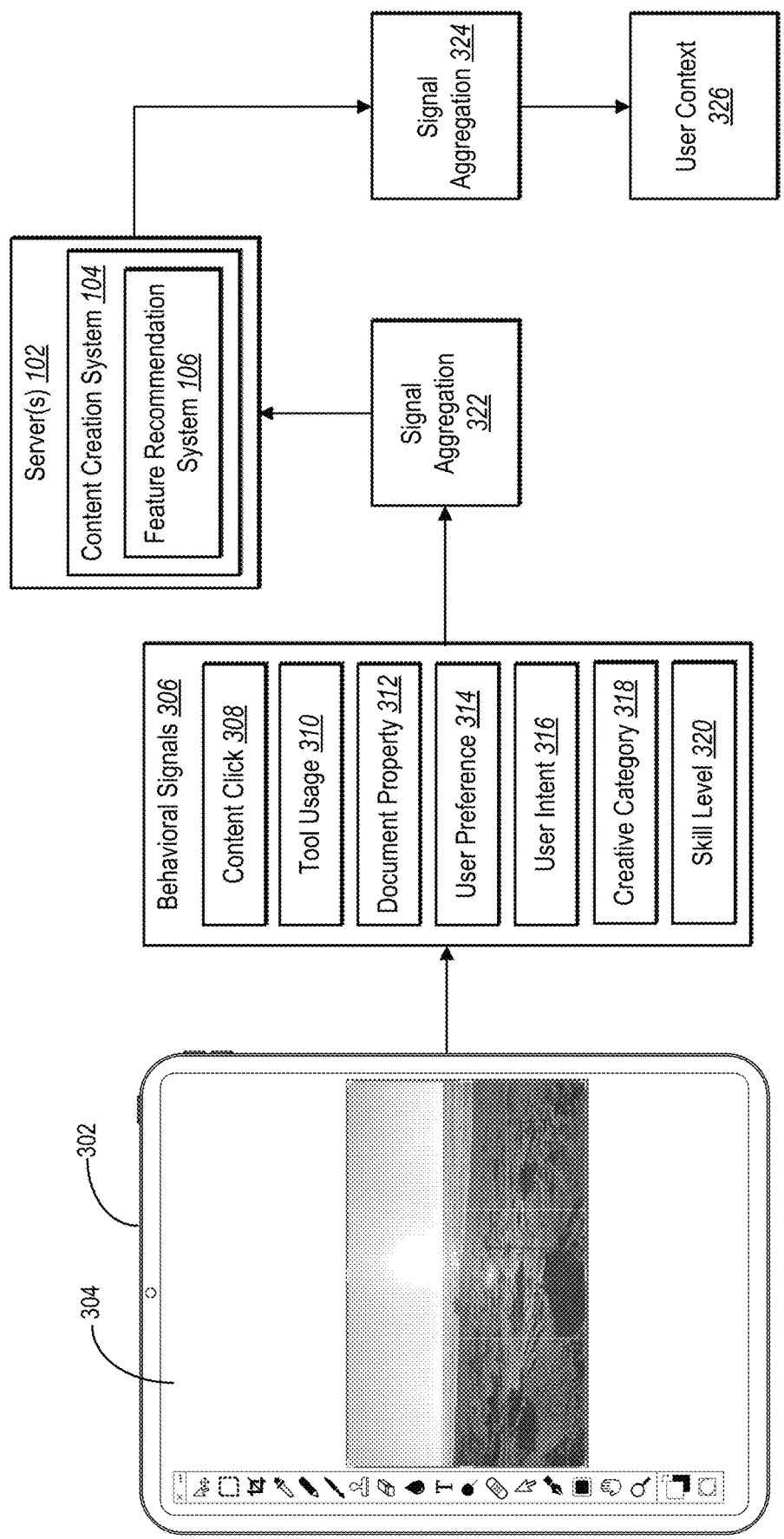
FIG. 3 illustrates a diagram for determining a user context based on behavior with respect to a software application in accordance with one or more embodiments.

As previously mentioned, in one or more embodiments, the feature recommendation system 106 determines a user context associated with a client device (e.g., associated with a user of the client device) based on behavior with respect to one or more software applications. FIG. 3 illustrates a diagram for determining a user context based on behavior with respect to a software application in accordance with one or more embodiments.

As shown in FIG. 3, and as discussed above, the feature recommendation system 106 monitors the behavior of a client device 302 with respect to a software application (from a suite of software applications). In particular, the feature recommendation system 106 monitors the behavior by monitoring user interactions with a graphical user interface 304 associated with the software applications.

As further shown, in FIG. 3, the feature recommendation system 106 monitors the behavior by generating behavioral signals 306 that reflect the behavior with respect to the software application. For example, in some implementations, the feature recommendation system 106 operates on the client device 302 to generate the behavioral signals 306 based on the user interactions with the graphical user interface 304.

As illustrated by FIG. 3, the behavioral signals 306 include a variety of signals. For instance, the behavioral signals 306 include a content click 308 (e.g., content selected for viewing or other access), a tool usage 310 (e.g., use of a tool to perform an action, such as modifying a digital document), a document property 312 (e.g., a latent or patent attribute of a document), a user preference 314 (e.g., a setting or preference associated with the client device 302, such as one established via a user profile accessed by the client device 302), a user intent 316 (e.g., an intended action or goal of the user interactions), a creative category 318 (e.g., a category of creative interested selected during the on-boarding process for the software application), and a skill level 320 (e.g., a skill level selected during the on-boarding process for the software application). Though FIG. 3 shows particular behavioral signals, it should be understood that the behavioral signals 306 can include various combinations of behavioral signals in various embodiments. Further, the feature recommendation system 106 generates multiple behavioral signals of a particular behavioral signal type (e.g., content click or user preference) in some embodiments.

Additionally, though FIG. 3 suggests that the feature recommendation system 106 generates the behavioral signals 306 directly from monitored behavior, it should be understood that the feature recommendation system 106 generates one or more of behavioral signals using one or more other behavioral signals in some instance. For example, in some embodiments, the feature recommendation system 106 determines the user intent 316 based on one or more other behavioral signals (e.g., the tool usage 310 or the creative category 318). In some implementations, the feature recommendation system 106 determines one or more behavioral signals in aggregating other behavioral signals.

Indeed, in one or more embodiments, the feature recommendation system 106 aggregates behavioral signals that reflect the behavior with respect to the software application. For instance, as shown in FIG. 3, the feature recommendation system 106 generates a signal aggregation 322 from the behavioral signals 306. To illustrate, in some embodiments, the feature recommendation system 106 operates on the client device 302 to generate the signal aggregation 322. In one or more embodiments, the feature recommendation system 106 generates the signal aggregation 322 by generating a de-duplicated timestamped history of events associated with the behavioral signals 306.

As illustrated by FIG. 3, the feature recommendation system 106 operating on the client device 302 transmits the signal aggregation 322 to the feature recommendation system 106 operating on the server(s) 102. Further, the feature recommendation system 106 operating on the server(s) 102 generates an additional signal aggregation 324 using the signal aggregation 322. In one or more embodiments, the feature recommendation system 106 generates the additional signal aggregation 324 to isolate one or more trends in behavior, such as daily tools used, lifetime tools used, types of digital documents used, and/or daily/weekly user intent categories. For example, in some cases, the feature recommendation system 106 generates the additional signal aggregation 324 to determine statistics that are indicative of one or more behavior trends. As further shown, the feature recommendation system 106 determines a user context 326 associated with the client device 302 (e.g., associated with the user of the client device 302) based on the additional signal aggregation 324.

In one or more embodiments, the feature recommendation system 106 utilizes a contextual intelligence framework for determining the signal aggregation 322, the additional signal aggregation 324, and/or the user context 326. Indeed, in some cases, the feature recommendation system 106 implements a contextual intelligence framework on the client device 302 and/or the server(s) 102. In some embodiments, the feature recommendation system 106 utilizes, as the contextual intelligence framework, the context management system described in U.S. patent application Ser. No. 17/069,637 filed on Oct. 13, 2020, entitled INTELLIGENTLY SENSING DIGITAL USER CONTEXT TO GENERATE RECOMMENDATIONS ACROSS CLIENT DEVICE APPLICATION, which is incorporated herein by reference in its entirety.

Figure 4:
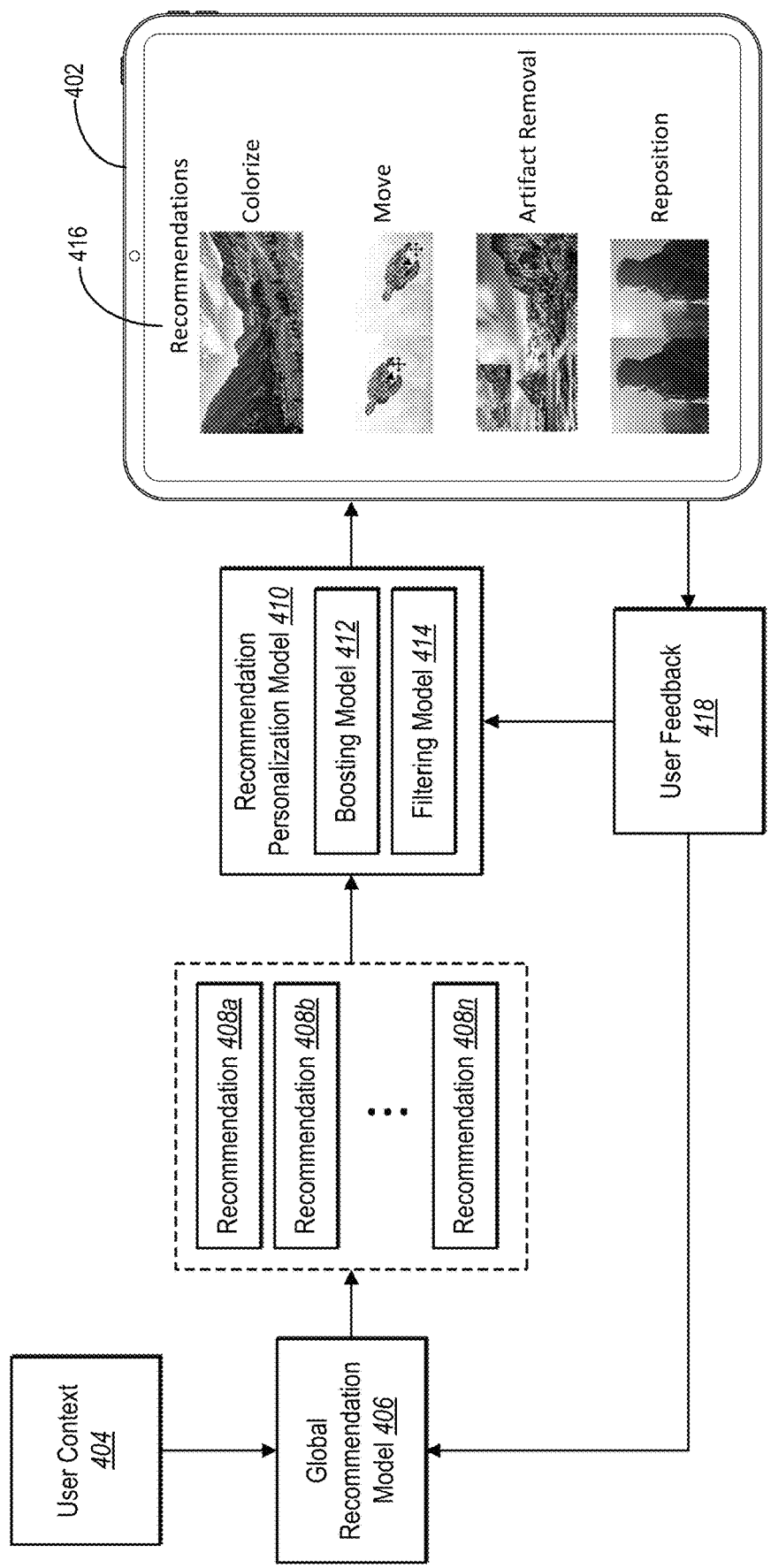
FIG. 4 illustrates a diagram for utilizing a user context to generate one or more recommendations for feature applications in accordance with one or more embodiments.

As previously mentioned, in one or more embodiments, the feature recommendation system 106 utilizes the user context associated with a client device to generate one or more recommendations for feature applications associated with a software application (or a suite of software applications). FIG. 4 illustrates a diagram for utilizing a user context to generate one or more recommendations for feature applications in accordance with one or more embodiments.

Indeed, as shown in FIG. 4, the feature recommendation system 106 determines a user context 404 associated with a client device 402 (as discussed above with reference to FIG. 3). In particular, in some embodiments, the feature recommendation system 106 determines the user context 404 with respect to one or more software applications from a suite of software applications. As further shown, the feature recommendation system 106 utilizes a global recommendation model 406 to analyze the user context 404 and generate recommendations 408a-408n based on the analysis. In some embodiments, each of the recommendations 408a-408n recommends an application feature associated with the suite of software applications.

In one or more embodiments, the global recommendation model 406 includes parameters corresponding to a plurality of users of the suite of software applications. In particular, in some embodiments, the feature recommendation system 106 learns the parameters of the global recommendation model 406 based on the behavior of the plurality of users with respect to the suite of software applications. Thus, in some cases, the feature recommendation system 106 utilizes the global recommendation model 406 to generate the recommendations 408a-408n in accordance with the totality of preferences of the plurality of users, rather than solely based on the behaviors/preferences of the user of the client device 402.

In one or more embodiments, the feature recommendation system 106 utilizes, as the global recommendation model 406, the recommendation framework described in U.S. patent application Ser. No. 17/367,134 filed on Jul. 2, 2021, entitled GENERATING DIGITAL RECOMMENDATIONS UTILIZING COLLABORATIVE FILTERING, REINFORCEMENT LEARNING, AND INCLUSIVE SETS OF NEGATIVE FEEDBACK, which is incorporated herein by reference in its entirety. In some embodiments, the feature recommendation system 106 utilizes, as the global recommendation model 406, one of the matrix factorization models described by James Le, *Recommendation System Series Part 4: The 7 Variants of Matrix Factorization for Collaborative Filtering,* 2020, https://towardsdatascience.com/recsys-series-part-4-the-7-variants-of-matrix-factorization-for-collaborative-filtering-368754e4fab5, which is incorporated herein by reference. In some cases, the feature recommendation system 106 utilizes, as the global recommendation model 406, the Blazing Text model described in Blazing Text Algorithm, https://docs.aws.amazon.com/sagemaker/latest/dg/blazingtext.html, or the distilled BERT model (distilBERT) described by Victor Sanh et al., *DistilBERT, a distilled version of BERT: smaller, faster, cheaper, and lighter,* arXiv:1910.01108, 2020, both of which are incorporated herein by reference in their entirety.

As further shown in FIG. 4, the feature recommendation system 106 utilizes a recommendation personalization model 410 to select one or more recommendations from the recommendations 408a-408n. In particular, the feature recommendation system 106 utilizes a personalized boosting model 412 and/or a personalized filtering model 414 to filter the recommendations 408a-408n to determine at least one recommendation to provide to the client device 402.

As indicated above, in one or more embodiments, the recommendation personalization model 410 (e.g., the personalized boosting model 412 and/or the personalized filtering model 414) includes parameters corresponding to the user of the client device 402. In particular, in some embodiments, the feature recommendation system 106 learns the parameters of the recommendation personalization model 410 based on the behavior of the user with respect to the suite of software applications (e.g., rather than behavior of multiple users). Thus, in some cases, the feature recommendation system 106 utilizes the recommendation personalization model 410 to determine at least one recommendation from the recommendations 408a-408n in accordance with the behaviors/preferences of the plurality of users, rather than solely based on the personal preferences of the user of the client device 402.

To illustrate, in one or more embodiments, the feature recommendation system 106 utilizes the personalized boosting model 412 to boost the likelihood that one or more of the recommendations 408a-408n are selected for provision to the client device 402. For instance, the feature recommendation system 106 can utilize the personalized boosting model 412 to increase a weighting/score of a recommendation or to classify a recommendation as favorable to the user of the client device 402 in accordance with one or more likes of the user. Similarly, in some cases, the feature recommendation system 106 utilizes the personalized filtering model 414 to decrease the likelihood that one or more of the recommendations 408a-408n are selected. For instance, the feature recommendation system 106 can utilize the personalized filtering model 414 to decrease a weighting/score of a recommendation, to classify a recommendation as unfavorable to the user of the client device 402, or to completely exclude a recommendation from consideration in accordance with one or more dislikes of the user.

By utilizing the recommendation personalization model 410 to select personalized recommendations, the feature recommendation system 106 operates more flexibly than many conventional systems. Indeed, by determining and providing recommendations based on the personal preferences of a user, the feature recommendation system 106 improves upon the rigid set of predetermined recommendations typically provided by conventional systems to all users regardless of their preference, interests, or needs.

As illustrated in FIG. 4, the feature recommendation system 106 provides the recommendations selected via the recommendation personalization model 410 for display within a graphical user interface 416 of the client device 402 (e.g., in response to receiving a recommendation request trigger). As further shown, the feature recommendation system 106 receives user feedback 418 regarding one or more of the recommendations displayed within the graphical user interface 416. For example, in some cases, the feature recommendation system 106 determines that a user has clicked on a provided recommendation. In some cases, the feature recommendation system 106 provides a request for feedback to the client device 402 and receives the user feedback 418 in response to the request.

As further indicated in FIG. 4, the feature recommendation system 106 utilizes the user feedback 418 to modify parameters of the global recommendation model 406. For example, in one or more embodiments, the feature recommendation system 106 combines the user feedback 418 with other user feedback received from other client devices regarding recommendations provided to those client devices. The feature recommendation system 106 further utilizes the combined feedback to modify the parameters of the global recommendation model 406. For instance, in some implementations, the feature recommendation system 106 utilizes the combined feedback to further train the global recommendation model 406. In one or more embodiments, the feature recommendation system 106 utilizes both negative user feedback and positive user feedback to modify the parameters of the global recommendation model 406.

Similarly, as shown, the feature recommendation system 106 utilizes the user feedback 418 to modify parameters of the recommendation personalization model 410. In particular, the feature recommendation system 106 utilizes the user feedback 418 to modify parameters of the personalized boosting model 412 and/or the personalized filtering model 414. To illustrate, in some instance, the feature recommendation system 106 utilizes positive user feedback to modify parameters of the personalized boosting model 412 and utilizes negative user feedback to modify parameters of the personalized filtering model 414. In some implementations, however, the feature recommendation system 106 utilizes both positive and negative use feedback to modify parameters of both models. In one or more embodiments, the feature recommendation system 106 modifies the parameters by retraining the recommendation personalization model 410 using the user feedback 418.

Thus, in one or more embodiments, the feature recommendation system 106 enables the user feedback from a particular user to improve upon the models used to personalize recommendations for that user. Indeed, by receiving user feedback from a user, the feature recommendation system 106 improves its understanding of the personal preferences of that user or determines that the personal preferences of the user have changed. Accordingly, the feature recommendation system 106 can modify the parameters of the recommendation personalization model that corresponds to that particular user to facilitate the provision of recommendations that are more relevant to the user.

In one or more embodiments, the feature recommendation system 106 utilizes the user feedback 418 to modify the global recommendation model 406 and/or the recommendation personalization model 410 in response to receiving a trigger signal. For instance, in some cases, the feature recommendation system 106 determines to modify model parameters directly in response to receiving the user feedback 418. In some implementations, the feature recommendation system 106 modifies the model parameters in response to determining that a threshold amount of user feedback has been received.

Figure 5:
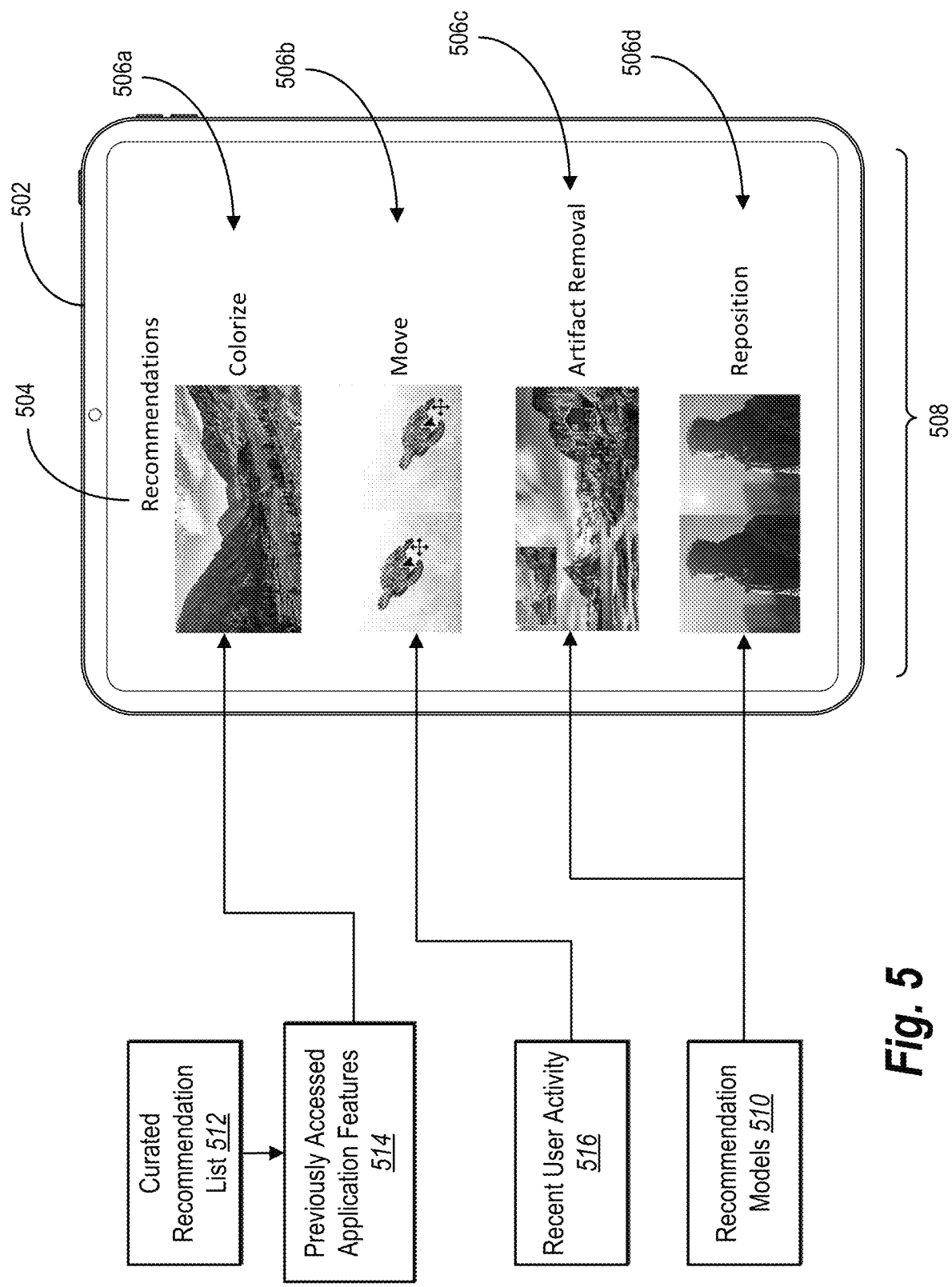
FIG. 5 illustrates a graphical user interface utilized by the feature recommendation system to provide one or more recommendations for display in accordance with one or more embodiments.

FIG. 5 illustrates a graphical user interface utilized by the feature recommendation system 106 to provide one or more recommendations for display in accordance with one or more embodiments. Indeed, as shown in FIG. 5, the feature recommendation system 106 provides a graphical user interface 502 for display on a client device 504. The feature recommendation system 106 further provides recommendations 506a-506d for display within the graphical user interface 502. In particular, the feature recommendation system 106 provides the recommendations 506a-506d for display within a visual recommendation component 508 of the graphical user interface 502.

In one or more embodiments, the feature recommendation system 106 causes the client device 504 to update the visual recommendation component 508 of the graphical user interface 502 to display the recommendations 506a-506d. For instance, in some cases, the visual recommendation component 508 displays one or more previously provided recommendations, and the feature recommendation system 106 causes the client device 504 to update the visual recommendation component 508 to display current recommendations. As previously mentioned, in some implementations, the feature recommendation system 106 causes the client device 504 to update the visual recommendation component 508 in response to receiving a recommendation request trigger (e.g., determining that client device is navigating to the graphical user interface 502 or determining that the client device has closed and/or re-opened a software application associated with the graphical user interface 502). As further discussed, the feature recommendation system 106 generates and provides the recommendations 506a-506d (e.g., causes the client device 504 to update the visual recommendation component 508) in real time, enabling the client device 504 to display the most current, relevant recommendations.

As shown in FIG. 5, the feature recommendation system 106 generates and provides recommendations utilizing various methods in addition to those discussed above with reference to FIGS. 3-4. Indeed, as illustrated, the feature recommendation system 106 generates and provides the recommendations 506c-506d utilizing recommendation models 510 (e.g., a global recommendation model and a recommendation personalization model) as discussed above with reference to FIGS. 3-4. As further shown, however, the feature recommendation system 106 generates and provides the recommendations 506a-506b utilizing other methods.

For instance, as shown in FIG. 5, the feature recommendation system 106 generates and provides the recommendation 506a utilizing a curated recommendations list 512 and previously accessed application features 514. In one or more embodiments, the 106 determines the previously accessed application features 514 by monitoring user interactions of the client device 504 with respect to the suite of software applications. Based on the monitored user interactions, the feature recommendation system 106 determines which application features associated with the software application or the suite of software applications have already been accessed by the client device 504. In some embodiments, if an application feature is included in the curated recommendations list 512 but is also included in the previously accessed application features 514, the feature recommendation system 106 removes the application feature from consideration for recommendation (or at least deprioritizes the application feature so that it is less likely to be selected for recommendation). In other words, in some implementations, the feature recommendation system 106 filters the curated recommendations list 512 utilizing the previously accessed application features 514 and generates the recommendation 506a from one of the application features that are left. Thus, the feature recommendation system 106 provides the client device 504 with recommendations for application features that may remain undiscovered by the user of the client device 504.

As further shown in FIG. 5, the feature recommendation system 106 generates and provides the recommendation 506b utilizing recent user activity 516 (e.g., user activity that has occurred within a threshold time period). For example, in one or more embodiments, the feature recommendation system 106 monitors user activity (e.g., user interactions) of the client device 504 with respect to the suite of software applications to identify content that has recently been consumed or interacted with via the client device 504, tools from the suite of software applications that have recently been used, or properties of digital documents that recently been used or accessed via the client device 504. In one or more embodiments, the feature recommendation system 106 generates the recommendation 506b for an application feature that relates to the recent user activity 516. For example, in some cases, the feature recommendation system 106 generates a recommendation for a tutorial about a tool recently utilized or a tutorial on how to modify digital documents of a particular digital document category associated with the recent user activity 516. Thus, the feature recommendation system 106 provides the client device 504 with recommendations for application features that can help a user complete a task that is in progress.

Thus, the feature recommendation system 106 can utilize behavior with respect to a suite of applications to generate and provide recommendations for application features via a variety of approaches. Though FIG. 5 illustrates utilizing a certain approach to generate and provide a certain number of recommendations, the feature recommendation system 106 generates and provides various numbers of recommendations via each approach in various embodiments.

Further, as behavior continues or changes with respect to the suite of software applications, the feature recommendation system 106 changes the recommendations that are displayed within the visual recommendation component 508. Indeed, in one or more embodiments, the feature recommendation system 106 continually monitors behavior associated with the client device 504 with respect to software applications from the suite of software applications. Upon receiving recommendation request triggers, the feature recommendation system 106 generates and provides new recommendations based on the behavior and causes the client device 504 to update the visual recommendation component 508 to display the new recommendations.

Accordingly, the feature recommendation system 106 operates more flexibly than conventional systems. Indeed, by providing a dynamically updated visual recommendation component, the feature recommendation system 106 offers improved flexibility over conventional systems that merely offer unchanging recommendations for predetermined features. Further, by determining and providing recommendations that are currently relevant to a user via the dynamically updated visual recommendation component, the feature recommendation system 106 reduces the user interactions required for navigating the graphical user interface to access those application features. Indeed, rather than navigating menus, sub-menus, and/or various windows, the feature recommendation system 106 enables the user to simply click on the provided recommendation.

Thus, in one or more embodiments, the algorithms and acts described with reference to FIGS. 4-5 can comprise the corresponding structure for performing a step for modifying a visual recommendation component to recommend one or more additional application features using the user interactions. Further, in some cases, the global recommendation model and the recommendation personalization model described above with reference to FIG. 4 can comprise the corresponding structure for performing a step for modifying a visual recommendation component to recommend one or more additional application features using the user interactions.

Figure 6:
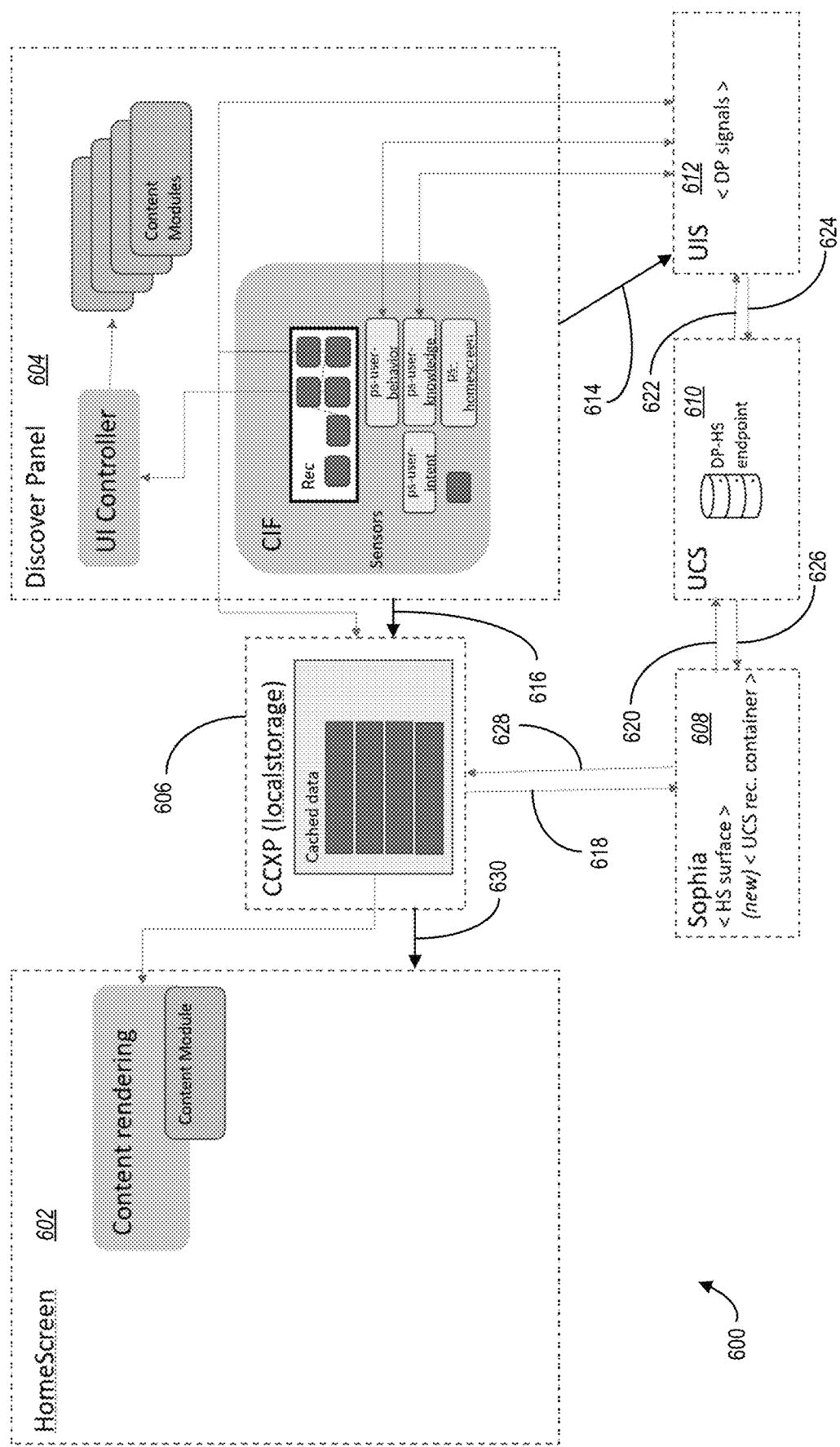
FIG. 6 illustrates the feature recommendation system generating and providing recommendations for application features within an example architectural environment in accordance with one or more embodiments.

The feature recommendation system 106 can operate within a variety of architectural environments. Indeed, as suggested above with reference to FIG. 1, the feature recommendation system 106 can operate on a single computing device in communication with one or more other computing devices or can operate on multiple computing devices. FIG. 6 illustrates the feature recommendation system generating and providing recommendations for application features within an example architectural environment in accordance with one or more embodiments.

In particular, FIG. 6 illustrates an architectural environment 600 that includes a plurality of components. In one or more embodiments, each component shown in FIG. 6 represents a software component that operates on the same computing device (or, at least, one or more of the components operates on the same computing device). In some cases, each component operates on a separate computing device.

As shown in FIG. 6, the architectural environment 600 includes a home screen component 602 (e.g., a landing page associated with one or more software applications from a suite of software applications), a discover panel component 604, a local storage component 606 (labeled "CCXP"), a communication routing component 608 (labeled "Sophia"), a user content service component 610 (labeled "UCS"), and a user internet service component 612 (labeled "UIS").

As shown in FIG. 6, the feature recommendation system 106 operates within the architectural environment 600 to capture and aggregate behavioral signals reflecting behavior with respect to one or more software applications. Indeed, in one or more embodiments, the feature recommendation system 106 monitors and captures user behavior with respect to one or more software applications. In some cases, the feature recommendation system 106 utilizes different in-application sensors to capture behavioral signals with respect to different behavioral characteristics, such as document properties, user intent signals, or tool usage. In one or more embodiments, the feature recommendation system 106 aggregates the behavioral signals via the discover panel component 604. In some embodiments, upon collecting/aggregating a certain number of behavioral signals or upon determining a threshold time period has passed after collecting the first behavioral signal, the feature recommendation system 106 sends a de-duplicated timestamped history of events from the discover panel component 604 to the user internet service component 612 as shown by the line 614. In some implementations, the user internet service component 612 stores the signal history in a database and further aggregates the signals to isolate certain behavior trends, such as daily tools used, lifetime tools used, document types used, or daily/weekly intent categories.

As further shown in FIG. 6, the feature recommendation system 106 operates within the architectural environment 600 to refresh recommendations provided for display. In one or more embodiments, the feature recommendation system 106 detects a recommendation request trigger at the discover panel component 604 (e.g., an application close event, a determination that a threshold number of behavioral signals have been collected/aggregated, or usage of a particular tool). As shown in FIG. 6, the feature recommendation system 106 routes the request for new recommendations from the discover panel component 604, through the local storage component 606 and the communication routing component 608, to the user content service component 610 as shown by the lines 616, 618, 620. The feature recommendation system 106 utilizes the user content service component 610 to initiates the generation of the recommendations in response to the request by requesting the appropriate signal aggregation(s) from the user internet service component 612, as shown by the line 622.

Additionally, as shown in FIG. 6, the feature recommendation system 106 operates within the architectural environment 600 to generate and provide the recommendations based on the collected/aggregated behavioral signals. In particular, the feature recommendation system 106 sends the requested signal aggregation(s) from the user internet service component 612 to the user content service component 610 as shown by the line 624. In one or more embodiments, the feature recommendation system 106 utilizes the user content service component 610 to determines one or more recommendations utilizing the aggregated signal(s) (e.g., by utilizing machine learning endpoints to predict the next content). The feature recommendation system 106 sends the recommendations back to the local storage component 606 through the communication routing component 608, as shown by the lines 626, 628. Further, the feature recommendation system 106 utilizes the local storage component 606 to retrieve (and cache) the content for the new recommendations and provides the content to the home screen component 602 as shown by the line 630. Accordingly, in some cases, when the client device of the user next displays the landing page the new recommendations with the retrieved content are shown.

Figure 7:
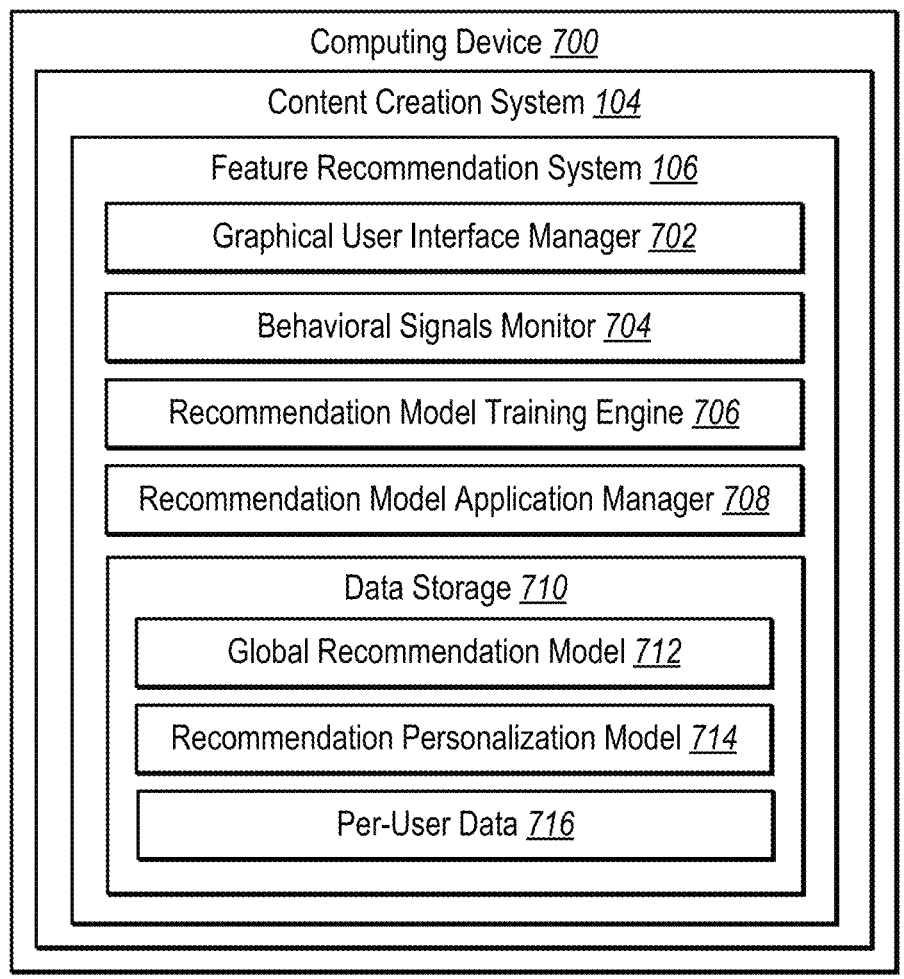
FIG. 7 illustrates an example schematic diagram of a feature recommendation system in accordance with one or more embodiments.

Turning to FIG. 7, additional detail will now be provided regarding various components and capabilities of the feature recommendation system 106. In particular, FIG. 7 shows the feature recommendation system 106 implemented by the computing device 700 (e.g., the server(s) 102 and/or one of the client devices 110a-110n discussed above with reference to FIG. 1). Additionally, the feature recommendation system 106 is also part of the content creation system 104. As shown, in one or more embodiments, the feature recommendation system 106 includes, but is not limited to, a graphical user interface manager 702, behavioral signals monitor 704, a recommendation model training engine 706, a recommendation model application manager 708, and data storage 710 (which includes a global recommendation model 712, a recommendation personalization model 714, and per-user data 716).

As just mentioned, and as illustrated in FIG. 7, the feature recommendation system 106 includes the graphical user interface manager 702. In one or more embodiments, the graphical user interface manager 702 causes the graphical user interface of a client device to display one or more visual elements. For instance, in some cases, when operating on a server, the graphical user interface manager 702 provides recommendations to a client device and causes the client device to display the recommendations. In some instances, when operating on a client device, the graphical user interface manager 702 receives recommendations and updates the display of the client device to show the recommendations. In one or more embodiments, the graphical user interface manager 702 causes the client device to update its graphical user interface to display the recommendations upon determining that the client device is accessing a landing page associated with a suite of applications (e.g., when the client device is accessing one of the software applications or is navigating to the landing page while the software application is being accessed).

Additionally, as shown in FIG. 7, the feature recommendation system 106 includes the behavioral signals monitor 704. In one or more embodiments, the behavioral signals monitor 704 collects and/or aggregates behavioral signals reflecting behavior with respect to one or more software applications from a suite of software applications. For instance, in some cases, the behavioral signals monitor 704 operates on a client device and detects, generates, and/or collects raw behavioral signals based on the user interactions with the one or more software applications. In some embodiments, the behavioral signals monitor further aggregates the behavioral signals at the client device to create a de-duplicated timestamped history of events and transmits the aggregation to a server. In some cases, the behavioral signals monitor at the server receives the aggregated signals and further processes the aggregation to isolate behavior trends. Thus, in one or more embodiments, the behavioral signals monitor 704 generates an additional signal aggregation and determines a user context using the additional signal aggregation.

As shown in FIG. 7, the feature recommendation system 106 further includes the recommendation model training engine 706. In one or more embodiments, the feature recommendation system 106 trains and/or re-trains the models used to generate recommendations for application features based on in-application behavior. For instance, in one or more embodiments, the recommendation model training engine 706 trains a global recommendation model and/or a recommendation personalization model using user behavioral data. In particular, in some embodiments, the 706 trains the global recommendation model using behavioral data associated with a plurality of users and further trains a recommendation personalization model corresponding to a particular user using the behavioral data associated with that user. In one or more embodiments, the recommendation model training engine 706 further re-trains the models using received user feedback with regard to provided recommendations. For instance, in some cases, the recommendation model training engine 706 utilize feedback received from a user to re-train (e.g., modify parameters of) the recommendation personalization model associated with that user.

Additionally, as shown, the feature recommendation system 106 includes the recommendation model application manager 708. In one or more embodiments, the recommendation model application manager 708 implements models for generating recommendations for application features based on in-application behavior. For instance, in some cases, the feature recommendation system 106 implements a global recommendation model and a recommendation personalization model to generate the recommendations. In some cases, the recommendation model application manager 708 generates the recommendations based on a user context determined by the behavioral signals monitor 704.

As shown in FIG. 7, the feature recommendation system 106 includes data storage 710. In particular, data storage 710 includes the global recommendation model 712, the recommendation personalization model 714 (e.g., at least one per user), which includes a personalized boosting model and/or a personalized filtering model, and the per-user data 716. Indeed, in one or more embodiments, the feature recommendation system 106 stores behavioral data (e.g., the raw behavioral signals and/or the aggregations of the signals) on a per-user data.

Each of the components 702-716 of the feature recommendation system 106 can include software, hardware, or both. For example, the components 702-716 can include one or more instructions stored on a computer-readable storage medium and executable by processors of one or more computing devices, such as a client device or server device. When executed by the one or more processors, the computer-executable instructions of the feature recommendation system 106 can cause the computing device(s) to perform the methods described herein. Alternatively, the components 702-716 can include hardware, such as a special-purpose processing device to perform a certain function or group of functions. Alternatively, the components 702-716 of the feature recommendation system 106 can include a combination of computer-executable instructions and hardware.

Furthermore, the components 702-716 of the feature recommendation system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 702-716 of the feature recommendation system 106 may be implemented as a stand-alone application, such as a desktop or mobile application. Furthermore, the components 702-716 of the feature recommendation system 106 may be implemented as one or more web-based applications hosted on a remote server. Alternatively, or additionally, the components 702-716 of the feature recommendation system 106 may be implemented in a suite of mobile device applications or "apps." For example, in one or more embodiments, the feature recommendation system 106 can comprise or operate in connection with digital software applications such as ADOBE® PHOTOSHOP®, ADOBE® INDESIGN®, or ADOBE® ILLUSTRATOR®. "ADOBE," "PHOTOSHOP," "INDESIGN," and "ILLUSTRATOR" are either registered trademarks or trademarks of Adobe Inc. in the United States and/or other countries.

Figure 8:
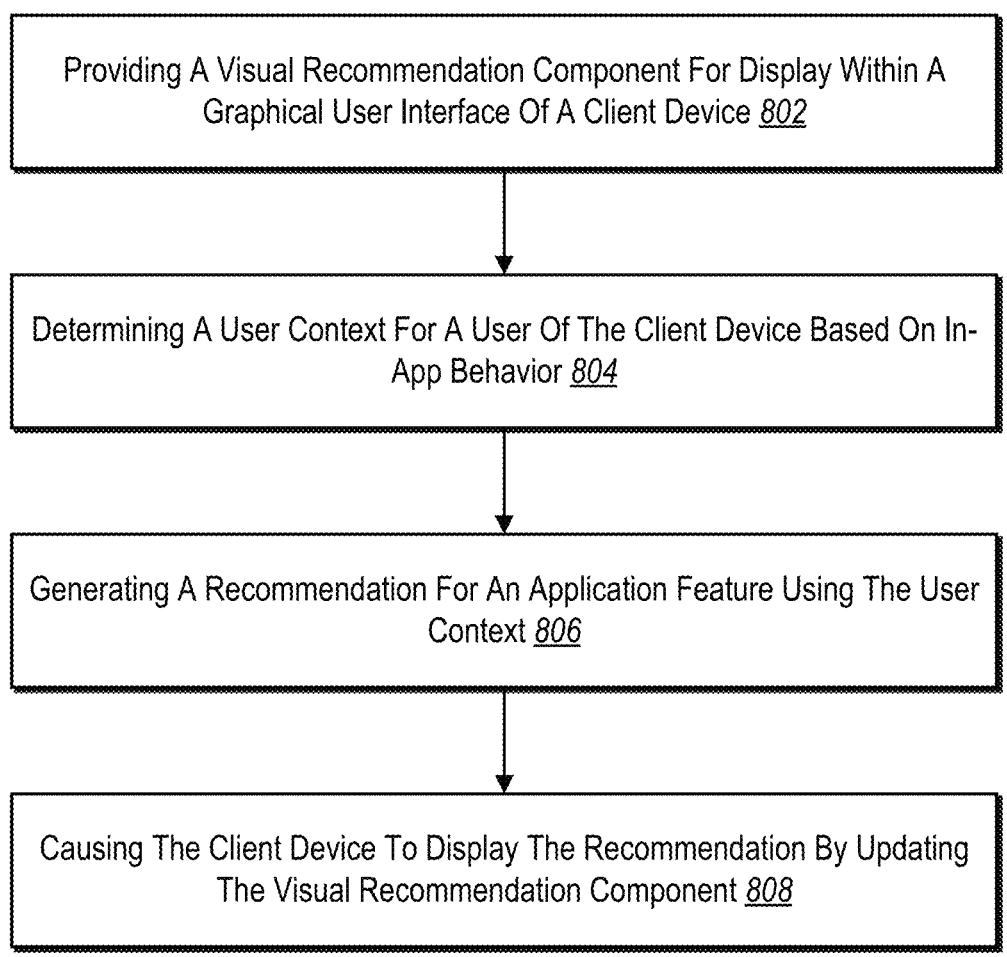
FIG. 8 illustrates a flowchart of a series of acts for generating and providing one or more application feature recommendations based on in-application behavior in accordance with one or more embodiments.

FIGS. 1-7, the corresponding text, and the examples provide a number of different methods, systems, devices, and non-transitory computer-readable media of the feature recommendation system 106. In addition to the foregoing, one or more embodiments can also be described in terms of flowcharts comprising acts for accomplishing the particular result, as shown in FIG. 8. FIG. 8 may be performed with more or fewer acts. Further, the acts may be performed in different orders. Additionally, the acts described herein may be repeated or performed in parallel with one another or in parallel with different instances of the same or similar acts.

FIG. 8 illustrates a flowchart of a series of acts 800 for generating and providing one or more application feature recommendations based on in-application behavior in accordance with one or more embodiments. FIG. 8 illustrates acts according to one embodiment, alternative embodiments may omit, add to, reorder, and/or modify any of the acts shown in FIG. 8. In some implementations, the acts of FIG. 8 are performed as part of a method. For example, in some embodiments, the acts of FIG. 8 are performed as part of a computer-implemented method. Alternatively, a non-transitory computer-readable medium can store instructions thereon that, when executed by at least one processor, cause a computing device to perform the acts of FIG. 8. In some embodiments, a system performs the acts of FIG. 8. For example, in one or more embodiments, a system includes at least one memory device comprising a global recommendation model corresponding to a plurality of users of a suite of software applications and a recommendation personalization model corresponding to personal preferences of a user of the suite of software applications. The system further includes at least one server device configured to cause the system to perform the acts of FIG. 8.

The series of acts 800 includes an act 802 for providing a visual recommendation component for display within a graphical user interface of a client device. For instance, in one or more embodiments, the act 802 involves providing a visual recommendation component for display within a graphical user interface of a client device, the visual recommendation component comprising at least one recommendation for an application feature associated with a suite of software applications accessible to the client device.

In one or more embodiments, the feature recommendation system 106 determines that the client device is accessing a software application from the suite of software applications; and provides a landing page associated with the software application for display within the graphical user interface based on determining that the client device is accessing the software application. Accordingly, in some embodiments, providing the visual recommendation component for display within the graphical user interface of the client device comprises providing the visual recommendation component for display within the landing page.

Additionally, the series of acts 800 includes an act 804 of determining a user context for a user of the client device based on in-application behavior. For example, in one or more embodiments, the act 804 involves determining a user context for a user of the client device using one or more behavioral signals reflecting a behavior with respect to one or more software applications from the suite of software applications.

In one or more embodiments, determining the user context for the user of the client device using the one or more behavioral signals reflecting the behavior with respect to the one or more software applications from the suite of software applications comprises determining the user context for the user using behavioral signals reflecting at least one of a content click, a tool usage, a document property, a user preference, a user intent, a creative category, or a skill level. In some embodiments, determining the user context for the user of the client device using the one or more behavioral signals reflecting the behavior with respect to the one or more software applications from the suite of software applications comprises determining the user context utilizing at least one aggregation of the one or more behavioral signals that reflects at least one behavior trend with respect to the one or more software applications.

The series of acts 800 also includes an act 806 of generating a recommendation for an application feature using the user context. To illustrate, in one or more embodiments, the act 806 involves generating, in real time and in response to detecting a recommendation request trigger, one or more additional recommendations for one or more additional application features associated with the suite of software applications utilizing the user context.

In one or more embodiments, generating the one or more additional recommendations utilizing the user context comprises generating a set of recommendations for the one or more additional application features utilizing a global recommendation model that corresponds to a plurality of users of the suite of applications. In some embodiments, generating the one or more additional recommendations further comprises determining, from the set of recommendations, at least one recommendation to provide to the client device utilizing a recommendation personalization model that learned to generate recommendations in accordance with personal preferences of the user. In some cases, determining, from the set of recommendations, the at least one recommendation to provide to the client device utilizing the recommendation personalization model that learned to generate recommendations in accordance with the personal preferences of the user comprises: determining classifications for the set of recommendations utilizing one or more classification models having parameters based on the personal preferences of the user; and selecting the at least one recommendation based on the classifications for the set of recommendations. In some implementations, the feature recommendation system 106 further receives user feedback regarding the one or more additional recommendations; and modifies parameters of the recommendation personalization model utilizing the user feedback.

Further, the series of acts 808 includes an act 808 of causing the client device to display the recommendation by updating the visual recommendation component. Indeed, in some implementations, the act 808 involves causing the client device to update the visual recommendation component of the graphical user interface to display the one or more additional recommendations.

In one or more embodiments, the feature recommendation system 106 detects the recommendation request trigger by detecting a closure of a software application from the suite of software applications. Accordingly, in some embodiments, causing the client device to update the visual recommendation component of the graphical user interface to display the one or more additional recommendations comprises causing the client device to update the visual recommendation component upon re-accessing the software application.

To provide an illustration, in one or more embodiments, the feature recommendation system 106 determines a user context for the user using one or more behavioral signals reflecting a behavior with respect to one or more software applications from the suite of software applications accessed by a client device of the user; generates, utilizing the global recommendation model, one or more recommendations for one or more application features associated with the suite of software applications based on the user context; determines at least one recommendation for the user by filtering the one or more recommendations utilizing the recommendation personalization model; and causes the client device to update a visual recommendation component of a graphical user interface of the client device to display the at least one recommendation.

In some cases, the feature recommendation system 106 determines the at least one recommendation for the user by filtering the one or more recommendations utilizing the recommendation personalization model by determining the at least one recommendation for the user by filtering the one or more recommendations utilizing a personalized filtering model corresponding to one or more dislikes of the user. Further, in some cases, the feature recommendation system 106 receives negative user feedback regarding the at least one recommendation; and modifies parameters of the personalized filtering model utilizing the negative user feedback.

In some embodiments, the feature recommendation system 106 determines the at least one recommendation for the user by filtering the one or more recommendations utilizing the recommendation personalization model by determining the at least one recommendation for the user by filtering the one or more recommendations utilizing a personalized boosting model corresponding to one or more likes of the user. Further, in some cases, the feature recommendation system 106 receives positive user feedback regarding the at least one recommendation; and modifies parameters of the personalized boosting model utilizing the positive user feedback.

In one or more embodiments, the feature recommendation system 106 further determines an additional recommendation for an additional application feature associated with the suite of software applications using previous user activity of the client device with respect to the one or more software applications from the suite of software applications accessed by the client device; and causes the client device to update the visual recommendation component of the graphical user interface of the client device to display the at least one recommendation by causing the client device to update the visual recommendation component to display the additional recommendation in conjunction with the at least one recommendation. In some embodiments, the feature recommendation system 106 determines the previous user activity of the client device with respect to the one or more software applications by determining at least one of content accessed by the client device via the one or more software applications, a software tool utilized by the client device via the one or more software applications, or one or more document properties associated with a document accessed by the client device via the one or more software applications.

Additionally, in one or more embodiments, the feature recommendation system 106 determines an additional recommendation for an additional application feature associated with the suite of software applications using a curated recommendations list and based on one or more application features previously accessed by the client device; and causes the client device to update the visual recommendation component of the graphical user interface of the client device to display the at least one recommendation by causing the client device to update the visual recommendation component to display the additional recommendation in conjunction with the at least one recommendation.

To provide another illustration, in one or more embodiments, the feature recommendation system 106 provides a visual recommendation component for display within a graphical user interface of a client device, the visual recommendation component comprising at least one recommendation for an application feature associated with a suite of software applications accessible to the client device; and monitors user interactions of the client device with respect to one or more software applications from the suite of software applications. In some cases, the feature recommendation system 106 further utilizes the user interactions to modify the visual recommendation component to recommend one or more additional application features. In some implementations, the feature recommendation system 106 further monitors user feedback with respect to the one or more additional application features recommended via the modified visual recommendation component; and determines at least one additional recommendation for another application feature associated with the suite of software applications using the user feedback. Indeed, in some instances, the feature recommendation system 106 further causes the client device to update the modified visual recommendation component to display the at least one additional recommendation.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
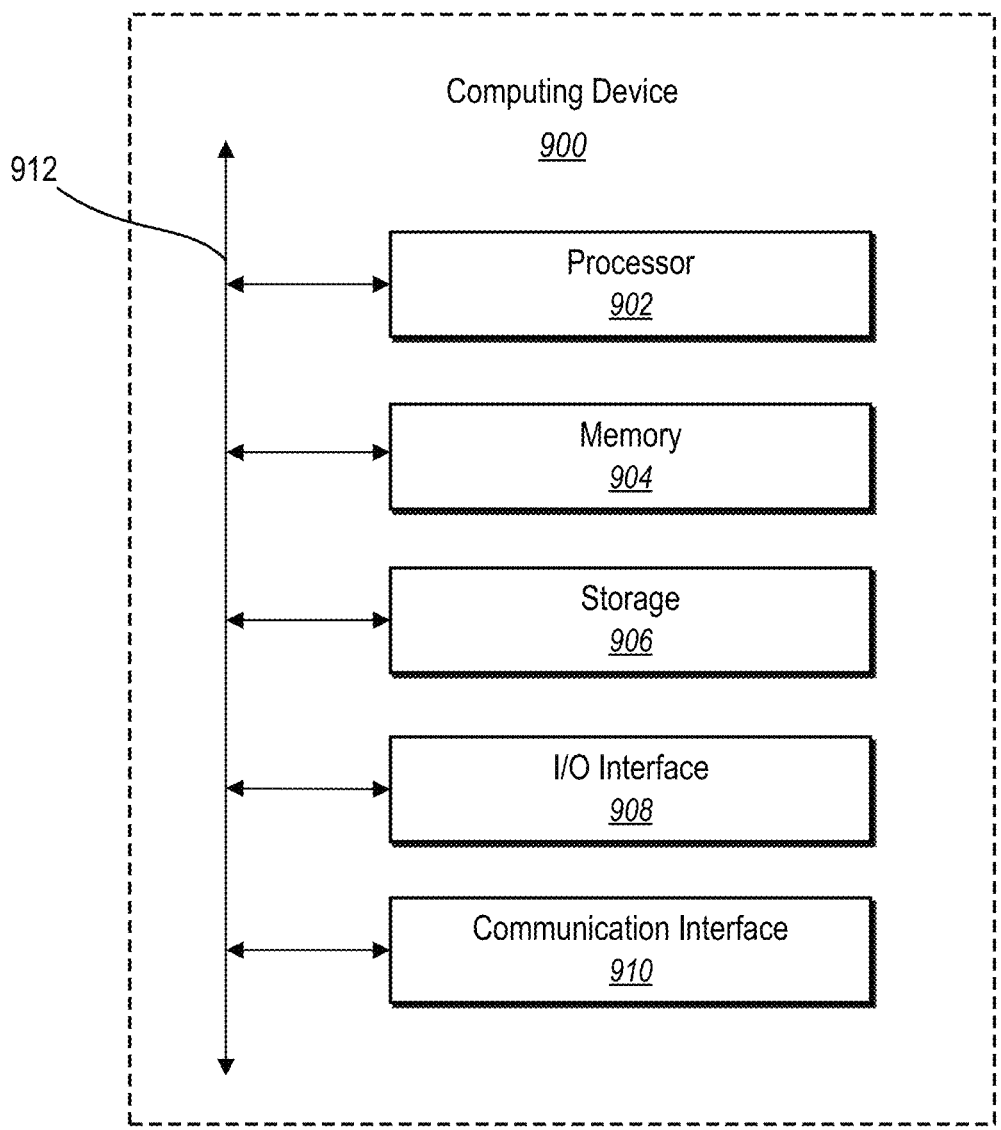
FIG. 9 illustrates a block diagram of an exemplary computing device in accordance with one or more embodiments.

FIG. 9 illustrates a block diagram of an example computing device 900 that may be configured to perform one or more of the processes described above. One will appreciate that one or more computing devices, such as the computing device 900 may represent the computing devices described above (e.g., the server(s) 102 and/or the client devices 110a-110n). In one or more embodiments, the computing device 900 may be a mobile device (e.g., a mobile telephone, a smartphone, a PDA, a tablet, a laptop, a camera, a tracker, a watch, a wearable device). In some embodiments, the computing device 900 may be a non-mobile device (e.g., a desktop computer or another type of client device). Further, the computing device 900 may be a server device that includes cloud-based processing and storage capabilities.

As shown in FIG. 9, the computing device 900 can include one or more processor(s) 902, memory 904, a storage device 906, input/output interfaces 908 (or "I/O interfaces 908"), and a communication interface 910, which may be communicatively coupled by way of a communication infrastructure (e.g., bus 912). While the computing device 900 is shown in FIG. 9, the components illustrated in FIG. 9 are not intended to be limiting. Additional or alternative components may be used in other embodiments. Furthermore, in certain embodiments, the computing device 900 includes fewer components than those shown in FIG. 9. Components of the computing device 900 shown in FIG. 9 will now be described in additional detail.

In particular embodiments, the processor(s) 902 includes hardware for executing instructions, such as those making up a computer program. As an example, and not by way of limitation, to execute instructions, the processor(s) 902 may retrieve (or fetch) the instructions from an internal register, an internal cache, memory 904, or a storage device 906 and decode and execute them.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 904 may be internal or distributed memory.

The computing device 900 includes a storage device 906 including storage for storing data or instructions. As an example, and not by way of limitation, the storage device 906 can include a non-transitory storage medium described above. The storage device 906 may include a hard disk drive (HDD), flash memory, a Universal Serial Bus (USB) drive or a combination these or other storage devices.

As shown, the computing device 900 includes one or more I/O interfaces 908, which are provided to allow a user to provide input to (such as user strokes), receive output from, and otherwise transfer data to and from the computing device 900. These I/O interfaces 908 may include a mouse, keypad or a keyboard, a touch screen, camera, optical scanner, network interface, modem, other known I/O devices or a combination of such I/O interfaces 908. The touch screen may be activated with a stylus or a finger.

The I/O interfaces 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 908 are configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 provides one or more interfaces for communication (such as, for example, packet-based communication) between the computing device and one or more other computing devices or one or more networks. As an example, and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can include hardware, software, or both that connects components of computing device 900 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions for generating personalized recommendation, and when executed by at least one processor, cause the at least one processor to perform operations comprising:
  providing a visual recommendation component for display within a graphical user interface of a client device, wherein the visual recommendation component comprising at least one recommendation for an application feature associated with a suite of software applications accessible to the client device; determining a user context for a user of the client device using one or more behavioral signals reflecting a behavior with respect to one or more software applications from the suite of software applications;
  generating, based on the user context and in response to detecting a recommendation request trigger, a set of additional recommendations for one or more additional application features associated with the suite of software applications utilizing a global recommendation model having parameters that reflect preferences of a plurality of users of the suite of software applications;
  generating, from the set of additional recommendations, one or more additional recommendations utilizing a recommendation personalization model having additional parameters that reflect personal preferences of the user of the client device; and
  causing the client device to update the visual recommendation component of the graphical user interface to display the one or more additional recommendations.

2. The non-transitory computer-readable medium of claim 1, wherein generating the set of additional recommendations utilizing the global recommendation model having the parameters that reflect the preferences of the plurality of users comprises generating the set of additional recommendations using the global recommendation model that learned the parameters based on the preferences of the plurality of users and behaviors of the plurality of users with respect to the suite of software applications.

3. The non-transitory computer-readable medium of claim 2, wherein generating the one or more additional recommendations from the set of additional recommendations using the recommendation personalization model having the additional parameters that reflect the personal preferences of the user comprises determining, from the set of additional recommendations, the one or more additional recommendations to provide to the client device using the recommendation personalization model that learned the additional parameters based on the personal preferences of the user and behaviors of the user with respect to the suite of applications.

4. The non-transitory computer-readable medium of claim 3, wherein determining, from the set of additional recommendations, the one or more additional recommendations utilizing the recommendation personalization model having the additional parameters that reflect the personal preferences of the user comprises:
   determining classifications for the set of additional recommendations utilizing one or more classification models having one or more parameters based on the personal preferences of the user; and
   selecting the one or more additional recommendations based on the classifications for the set of additional recommendations.

5. The non-transitory computer-readable medium of claim 3, further comprising instructions that, when executed by the at least one processor, cause the at least one processor to perform operations comprising:
   receiving user feedback regarding the one or more additional recommendations; and
   modifying the additional parameters of the recommendation personalization model utilizing the user feedback.

6. The non-transitory computer-readable medium of claim 1, further comprising instructions that, when executed by the at least one processor, cause the at least one processor to perform operations comprising detecting the recommendation request trigger by detecting a closure of a software application from the suite of software applications, wherein causing the client device to update the visual recommendation component of the graphical user interface to display the one or more additional recommendations comprises causing the client device to update the visual recommendation component upon re-accessing the software application.

7. The non-transitory computer-readable medium of claim 1, further comprising instructions that, when executed by the at least one processor, cause the at least one processor to perform operations comprising:
   determining that the client device is accessing a software application from the suite of software applications; and
   providing a landing page associated with the software application for display within the graphical user interface based on determining that the client device is accessing the software application, wherein providing the visual recommendation component for display within the graphical user interface of the client device comprises providing the visual recommendation component for display within the landing page.

8. The non-transitory computer-readable medium of claim 1, wherein determining the user context for the user of the client device using the one or more behavioral signals reflecting the behavior with respect to the one or more software applications from the suite of software applications comprises determining the user context for the user using behavioral signals reflecting at least one of a content click, a tool usage, a document property, a user preference, a user intent, a creative category, or a skill level.

9. The non-transitory computer-readable medium of claim 1, wherein determining the user context for the user of the client device using the one or more behavioral signals reflecting the behavior with respect to the one or more software applications from the suite of software applications comprises determining the user context utilizing at least one aggregation of the one or more behavioral signals that reflects at least one behavior trend with respect to the one or more software applications.

10. A system for generating personalized recommendation, the system comprising:
    at least one memory device comprising:
       a visual recommendation component for display within a graphical user interface of a client device, wherein the visual recommendation component comprising at least one recommendation for an application feature associated with a suite of software applications accessible to the client device;
       a global recommendation model having parameters that reflect preferences of a plurality of users of the suite of software applications; and
       a recommendation personalization model having additional parameters that reflect personal preferences of a user of the suite of software applications; and
    at least one server device configured to cause the system to:
       determine a user context for the user using one or more behavioral signals reflecting a behavior with respect to one or more software applications from the suite of software applications accessed by the client device of the user;
       generate, utilizing the global recommendation model, a set of additional recommendations for one or more application features associated with the suite of software applications based on the user context;
       determine one or more additional recommendations for the user by filtering the set of additional recommendations utilizing the recommendation personalization model; and
       cause the client device to update a visual recommendation component of a graphical user interface of the client device to display the one or more additional recommendations.

11. The system of claim 10, wherein the at least one server device is configured to cause the system to determine the at least one recommendation for the user by filtering the one or more recommendations utilizing the recommendation personalization model by determining the at least one recommendation for the user by filtering the one or more recommendations utilizing a personalized filtering model corresponding to one or more dislikes of the user.

12. The system of claim 11, wherein the at least one server device is further configured to cause the system to:
    receive negative user feedback regarding the at least one recommendation; and
    modify the additional parameters of the personalized filtering model utilizing the negative user feedback.

13. The system of claim 10, wherein the at least one server device is configured to cause the system to determine the at least one recommendation for the user by filtering the one or more recommendations utilizing the recommendation personalization model by determining the at least one recommendation for the user by filtering the one or more recommendations utilizing a personalized boosting model corresponding to one or more likes of the user.

14. The system of claim 13, wherein the at least one server device is further configured to cause the system to:
receive positive user feedback regarding the at least one recommendation; and
modify the additional parameters of the personalized boosting model utilizing the positive user feedback.

15. The system of claim 10, wherein the at least one server device is further configured to cause the system to:
determine an additional recommendation for an additional application feature associated with the suite of software applications using previous user activity of the client device with respect to the one or more software applications from the suite of software applications accessed by the client device; and
cause the client device to update the visual recommendation component of the graphical user interface of the client device to display the at least one recommendation by causing the client device to update the visual recommendation component to display the additional recommendation in conjunction with the at least one recommendation.

16. The system of claim 15, wherein the at least one server device is further configured to determine the previous user activity of the client device with respect to the one or more software applications by determining at least one of content accessed by the client device via the one or more software applications, a software tool utilized by the client device via the one or more software applications, or one or more document properties associated with a document accessed by the client device via the one or more software applications.

17. The system of claim 10, wherein the at least one server device is further configured to cause the system to:
determine an additional recommendation for an additional application feature associated with the suite of software applications using a curated recommendations list and based on one or more application features previously accessed by the client device; and
cause the client device to update the visual recommendation component of the graphical user interface of the client device to display the at least one recommendation by causing the client device to update the visual recommendation component to display the additional recommendation in conjunction with the at least one recommendation.

18. A computer-implemented method of generating personalized recommendation, the method comprising:
providing a visual recommendation component for display within a graphical user interface of a client device, wherein the visual recommendation component comprising at least one recommendation for an application feature associated with a suite of software applications accessible to the client device;
monitoring user interactions of the client device with respect to one or more software applications from the suite of software applications;
generating, based on the user interactions and in response to detecting a recommendation request trigger, a set of additional recommendations for one or more additional application features associated with the suite of software applications utilizing a global recommendation model having parameters that reflect preferences of a plurality of users of the suite of software applications;
generating, from the set of additional recommendations, one or more additional recommendations utilizing a recommendation personalization model having parameters that reflect preferences of the user of the client device; and
modifying the visual recommendation component to provide the one or more additional recommendations.

19. The computer-implemented method of claim 18, further comprising:
monitoring user feedback with respect to the one or more additional application features recommended via the modified visual recommendation component; and
determining at least one additional recommendation for another application feature associated with the suite of software applications using the user feedback.

20. The computer-implemented method of claim 19, further comprising causing the client device to update the modified visual recommendation component to display the at least one additional recommendation.

* * * * *